United States Patent
Hossain et al.

(10) Patent No.: US 11,761,897 B1
(45) Date of Patent: *Sep. 19, 2023

(54) METHOD FOR OBTAINING A RAMAN SPECTRUM OF AN ANALYTE

(71) Applicant: KING FAHD UNIVERSITY OF PETROLEUM AND MINERALS, Dhahran (SA)

(72) Inventors: Mohammad Kamal Hossain, Dhahran (SA); Qasem Ahmed Drmosh, Dhahran (SA); Amar Kamal Mohamedkhair, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 17/936,415

(22) Filed: Sep. 29, 2022

Related U.S. Application Data

(63) Continuation of application No. 17/745,279, filed on May 16, 2022, now Pat. No. 11,480,524.

(51) Int. Cl.
 *G01N 21/65* (2006.01)
 *C03C 17/36* (2006.01)
 (Continued)

(52) U.S. Cl.
 CPC ....... *G01N 21/658* (2013.01); *C03C 17/3605* (2013.01); *C03C 17/3644* (2013.01);
 (Continued)

(58) Field of Classification Search
 None
 See application file for complete search history.

(56) References Cited

U.S. PATENT DOCUMENTS

| 7,242,470 B2 | 7/2007 | Cullum et al. |
| 8,898,811 B2 | 11/2014 | Jen et al. |

(Continued)

FOREIGN PATENT DOCUMENTS

| CN | 104746049 B | 10/2017 |
| CN | 105572100 B | 7/2018 |

(Continued)

OTHER PUBLICATIONS

P. Pal, et al., "A generalized exponential relationship between the surface-enhanced Raman scattering (SERS) efficiency of gold/silver nanoisland arrangements and their non-dimensional interparticle distance/particle diameter ratio", Sensors and Actuators A: Physical, vol. 314, 2020, pp. 1-10.

*Primary Examiner* — David Sample
(74) *Attorney, Agent, or Firm* — Oblon, McClelland, Maier & Neustadt, L.L.P.

(57) ABSTRACT

A surface-enhanced Raman scattering (SERS) substrate and its method of formation is disclosed. The surface-enhanced Raman scattering (SERS) substrate comprises a solid support, a first noble metal nanoparticles is disposed on the solid support, a porous oxide layer comprising transition metal oxide nanoparticles is disposed on the first noble metal nanoparticles and a second noble metal nanoparticles is disposed on the porous oxide layer. The porous oxide layer prevents contact between the first noble metal nanoparticles and the second noble metal nanoparticles and has a mean pore size of 2 to 30 nm.

12 Claims, 18 Drawing Sheets

(51) Int. Cl.
*C04B 35/622* (2006.01)
*C04B 35/64* (2006.01)
*C04B 35/453* (2006.01)

(52) U.S. Cl.
CPC ........ *C03C 17/3649* (2013.01); *C04B 35/453* (2013.01); *C04B 35/62222* (2013.01); *C04B 35/64* (2013.01); *C03C 2217/216* (2013.01); *C03C 2217/255* (2013.01); *C03C 2217/256* (2013.01); *C03C 2217/42* (2013.01); *C03C 2217/425* (2013.01); *C03C 2218/154* (2013.01); *C04B 2235/3284* (2013.01); *C04B 2235/408* (2013.01); *C04B 2235/5454* (2013.01); *C04B 2235/661* (2013.01)

(56) References Cited

U.S. PATENT DOCUMENTS 9,127,984 B2    9/2015  Tseng et al.
11,480,524 B1 * 10/2022  Hossain .................. C04B 35/64

FOREIGN PATENT DOCUMENTS

| CN | 110987901 B | 8/2020 |
| KR | 20220020480 A | 2/2022 |

* cited by examiner

METHOD FOR OBTAINING A RAMAN SPECTRUM OF AN ANALYTE

CROSS-REFERENCE TO RELATED APPLICATIONS

The present application is a Continuation of U.S. application Ser. No. 17/745,279, now allowed, having a filing date of May 16, 2022.

STATEMENT OF PRIOR DISCLOSURE BY THE INVENTORS

Aspects of the present disclosure are described in the article "Plasmonic Pollen Grain Nanostructures: A Three-Dimensional Surface-Enhanced Raman Scattering (SERS)-Active Substrate" published in Chemistry An Asian Journal 2021, Vol 16, Issue 13, 1807-1819, available on May 19, 2021, which is incorporated herein by reference in its entirety.

BACKGROUND

Technical Field

The present disclosure is directed to Raman spectroscopy and spectroscopic imaging and, more particularly relates to surface-enhanced Raman scattering (SERS) substrate.

Description of Related Art

The "background" description provided herein is for the purpose of generally presenting the context of the disclosure. Work of the presently named inventors, to the extent it is described in this background section, as well as aspects of the description that may not otherwise qualify as prior art at the time of filing, are neither expressly or impliedly admitted as prior art against the present disclosure.

Surface-enhanced Raman scattering (SERS) is known as a powerful label free analytical tool. SERS, being a subset of standard Raman spectroscopic techniques, provides detailed and fingerprint information about materials at the molecular level. The SERS technique significantly enhances the Raman signal from analyte molecules. Enhanced SERS emission is achieved when an analyte is adsorbed onto or in close proximity of SERS-active substrate.

Two main mechanisms are typically considered to be responsible for the surface enhancement; electromagnetic (EM) mechanism (EM enhancement) and chemical mechanism (CE enhancement). Typically, the EM mechanism is the dominant contributor to the enhancement, reching enhancement factors as high as $10^5$-$10^7$. In the EM mechanism, a surface plasmon resonance of a suitable plasmonic material creates a much stronger electromagnetic field located very close to the plasmonic material, typically within a few to tens of nanometers. This enhanced electromangetic field is referred to as the localized surface plasmon resonance (LSPR)-mediated electromagnetic (EM) field and is the main component that makes such tremendous amplification of standard Raman signal of target analyte. However, such EM field localizations are heavily influenced by the nanometric morphology of the plasmonic material and substrate, as well as the characteristics of the excitation used, in SERS measurements. Therefore, this is a key challenge to fabricate a cost-effective plasmonic substrates that facilitate higher enhancement and provide reproducible and predictable SERS-activity for a wide range of analytes.

SERS-active substrates comprising plasmonic materials are mainly fabricated using two different techniques: physical deposition and wet-chemical synthesis. However, both techniques have several limitations. For example, in wet-chemical synthesis, synthesized colloidal nanoparticles have surfactants or other surface ligands that inhibit target analyte to be at the point of maximal EM field enhancement (the "hot spot") at the time of measuring. Also, lack of control in nanomorphology and nanoassembly makes it difficult to fabricate reproducible and predefined SERS-active substrate. Physical deposition techniques such as lithography, template methods, and thermal vapor deposition are expensive and labor-intensive. For example, in thermal deposition technique, an adequate control over deposition time, power, and a strict environment condition to develop the SERS-active substrate is required. Further such SERS substrates developed via both techniques typically include a distribution of hot sites only in X-Y plane (i.e Z=0) that reduces the chances of the target analyte to be at the hot sites.

In view of the foregoing is an objective of the present disclosure to provide a SERS substrate with a controlled nanoarchitecture and method of its fabrication.

SUMMARY

The present disclosure relates to a surface-enhanced Raman scattering (SERS) substrate, comprising a solid support, first noble metal nanoparticles disposed on the solid support, a porous oxide layer comprising transition metal oxide nanoparticles disposed on the first noble metal nanoparticles, and second noble metal nanoparticles disposed on the porous oxide layer, wherein the porous oxide layer prevents contact between the first noble nanoparticles and the second noble nanoparticles and has a mean pore size of 2 to 30 nm.

In some embodiments, the solid support is glass.

In some embodiments, the first noble metal and second noble metal are each independently selected from the group consisting of gold, platinum, palladium, ruthenium, rhodium, osmium, silver, copper, mercury, rhenium, iridium, and alloys thereof.

In some embodiments, the first noble metal nanoparticles are silver nanoparticles.

In some embodiments, the silver nanoparticles are crystalline by PXRD and have a mean particle size of 40 to 130 nm.

In some embodiments, the second noble metal nanoparticles are gold nanoparticles.

In some embodiments, the gold nanoparticles are crystalline by PXRD and have a mean particle size of 75 to 150 nm.

In some embodiments, the transition metal oxide nanoparticles are wurtzite zinc oxide nanoparticles which are crystalline by PXRD and have a mean particle size of 10 to 50 nm.

In some embodiments, the zinc oxide nanoparticles are present in the porous oxide layer as agglomerates having a mean size of 150 to 300 nm.

In some embodiments, the surface-enhanced Raman scattering (SERS) substrate has a band gap of greater than 3.16 eV to 3.30 eV.

The present disclosure also relates to a method of forming the surface-enhanced Raman scattering (SERS) substrate, the method comprising depositing a first noble metal film onto the solid support to form a first-coated support, annealing the first-coated support at 450 to 650° C. to form a first nanoparticle-coated support, depositing the porous oxide layer onto the first nanoparticle-coated support to form an oxide-coated support, depositing a second noble metal film onto the oxide-coated support to form a second-coated support, and annealing the second-coated support at 500 to 700° C. to form the surface-enhanced Raman scattering (SERS) substrate.

In some embodiments, the depositing of the silver film, the porous oxide layer, and the gold film are performed by sputtering.

In some embodiments, the first noble metal is silver and the silver film has a mean film thickness of 30 to 60 nm.

In some embodiments, the second noble metal is gold and the gold film has a mean film thickness of 20 to 50 nm.

In some embodiments, the annealing the silver film is performed in inert atmosphere.

In some embodiments, the transition metal oxide nanoparticles are wurtzite zinc oxide nanoparticles which are crystalline by PXRD and have a mean particle size of 10 to 50 nm.

In some embodiments, the zinc oxide nanoparticles are present in the porous oxide layer as agglomerates having a mean size of 150 to 300 nm.

The present disclosure also relates to a method of obtaining a Raman spectrum of an analyte, the method comprising depositing the analyte onto the surface-enhanced Raman scattering (SERS) substrate to form a sample, exposing the sample to laser light such that a portion of the laser light is scattered by the sample to form scattered light, and detecting the scattered light.

In some embodiments, the analyte contacts at least one selected from the group consisting of the first noble metal nanoparticles, the porous oxide layer, and the second noble metal nanoparticles.

In some embodiments, the laser light has a wavelength of 522 to 542 nm and the SERS substrate has an enhancement factor of greater than $1.1 \times 10^6$ to $5.9 \times 10^6$.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
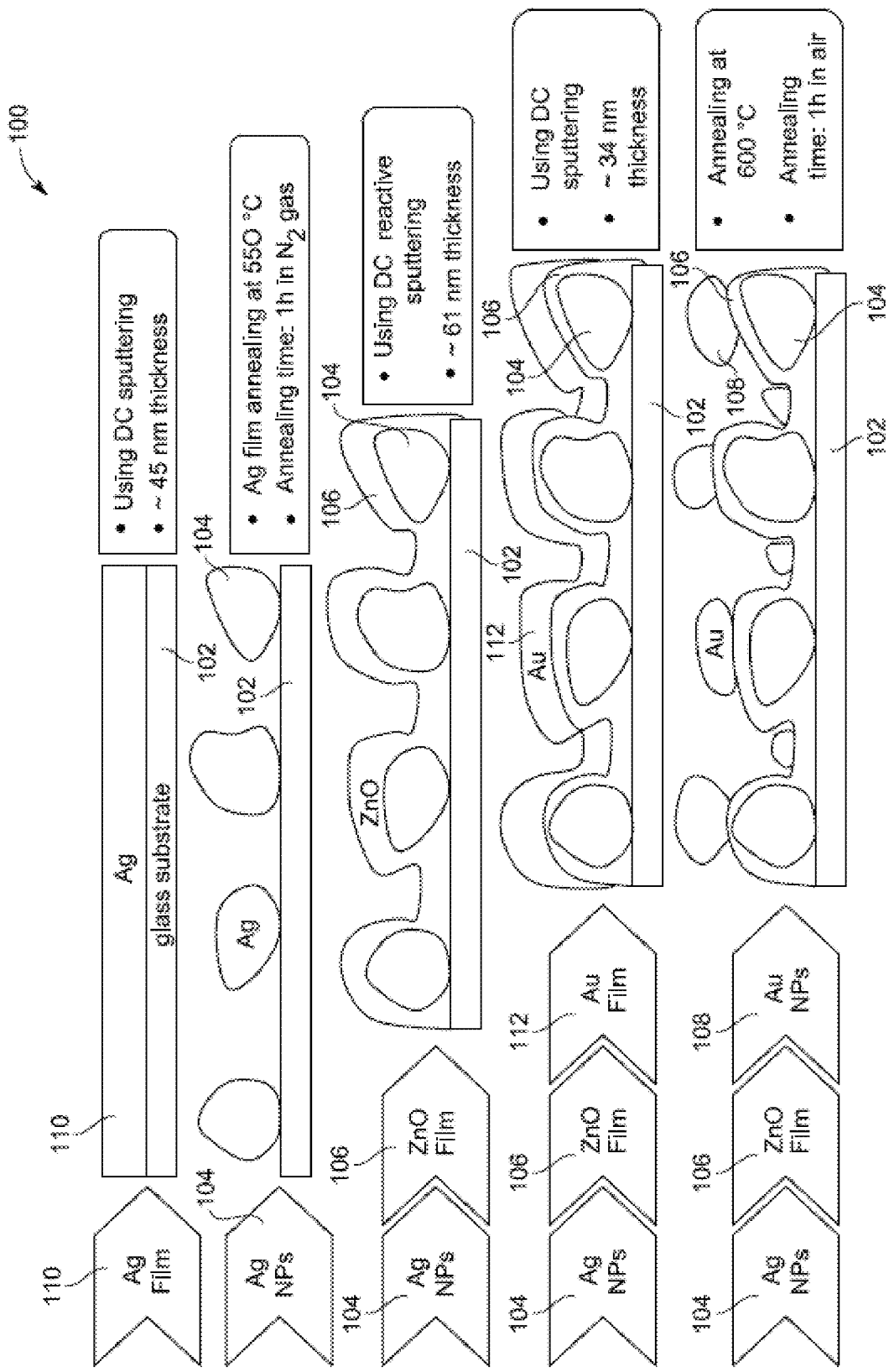
FIG. 1 is an exemplary schematic diagram of a method of fabrication of a surface-enhanced Raman scattering (SERS) substrate, according to certain embodiments.

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of the present disclosure are directed to plasmonic pollen grain like nanostructures (called hereafter PGNSs) as a surface-enhanced Raman spectroscopy (SERS) substrate, a method of its preparation, and a method of obtaining a Raman spectrum of an analyte using the SERS substrate.

The surface-enhanced Raman scattering (SERS) substrate comprises a solid support, first noble metal nanoparticles disposed on the solid support, a porous oxide layer comprising transition metal oxide nanoparticles disposed on the first noble metal nanoparticles, and second noble metal nanoparticles disposed on the porous oxide layer. The porous oxide layer prevents contact between the first noble nanoparticles and the second noble nanoparticles.

The solid support may be any suitable material known to one of ordinary skill in the art. Examples of suitable substrates include, but are not limited to glass, sapphire, diamond, silicon, geranium, a binary semiconductor such as gallium arsenide, zinc sulfide, and cadmium selenide, a metal such as titanium, nickel, chromium, aluminum, and copper, and mixtures thereof. The glass may be any suitable type of glass, for example soda lime glass, borosilicate glass, aluminosilicate glass, lead glass, annealed glass, tempered glass, chemically strengthened glass, laminated glass, quartz, fluorine-doped tin oxide (FTO), indium tin oxide (ITO), and fused silica. In some embodiments, the first noble metal and second noble metal are each independently selected from the group consisting of gold, platinum, palladium, ruthenium, rhodium, osmium, silver, copper, mercury, rhenium, iridium, and alloys thereof. Examples of copper alloys include, but are not limited to gilding metal; Muntz metal; beryllium copper; nickel silver; cupronickel; Dunce metal; bronzes such as manganese bronze, tin bronze, leaded tin bronze, aluminum bronze, silicon bronze, phosphor bronze, commercial bronze, architectural bronze, mild bronze, bell metal, arsenical bronze, speculum metal, and cymbal alloy; and brasses such as Abyssinian gold, admiralty brass, Aich's alloy, aluminum brass, arsenical brass, cartridge brass, common brass, DZR brass, delta metal, free machining brass, high brass, leaded brass, low brass, manganese brass, naval brass, nickel brass, Nordic gold, drichalcum, Prince's metal, red brass (also known as gunmetal), tombac, silicon tombac, tonval brass, and yellow brass. Other exemplary alloys include gold alloys with copper and silver (colored gold, crown gold, electrum), gold alloys with rhodium (rhodite), gold alloys with copper (rose gold, tumbaga), gold alloys with nickel and palladium (white gold), gold alloys including the addition of platinum, manganese, aluminum, iron, indium and other appropriate elements or mixtures thereof, silver alloys with copper (shibuichi, sterling silver, Tibetan silver, Britannia silver), silver alloys with copper and gold (goloid), silver alloys with copper and germanium (argentium sterling silver), silver alloys with platinum (platinum sterling), silver alloys with copper (silver graphite), silver alloys including the addition of palladium, zinc, iridium, and tin and other appropriate elements or mixtures thereof, platinum alloys with gold, platinum alloys with cobalt, platinum alloys with rare earth elements, and platinum alloys with nickel. In some embodiments, the first noble metal nanoparticles are formed from the same noble metal as the second noble metal nanoparticles. In preferred embodiments, the first noble metal nanoparticles are formed from a different noble metal as the second noble metal nanoparticles. For example, the first noble metal nanoparticles may be any noble metal as described above (gold, platinum, palladium, ruthenium, rhodium, osmium, silver, copper, mercury, rhenium, iridium, or an alloy thereof), and the second noble metal nanoparticles may be any other noble metal. Such a different noble metal may be a different alloy which comprises one or more noble metals in common, but which differs in terms of composition such as identity of other metals not in common or in the relative amounts of constituent metals. In some embodiments, the first noble metal nanoparticles are silver nanoparticles. In some embodiments, the second noble metal nanoparticles are gold nanoparticles. In preferred embodiments, the first noble metal nanoparticles are silver nanoparticles and the second noble metal nanoparticles are gold nanoparticles. In some embodiments, the first noble metal nanoparticles are crystalline by PXRD. In some embodiments, the second noble metal nanoparticles are crystalline by PXRD.

In general, the first noble metal nanoparticles can be any shape known to one of ordinary skill in the art. Examples of suitable shapes the first noble metal nanoparticles may take include spheres, spheroids, lentoids, ovoids, solid polyhedra such as tetrahedra, cubes, octahedra, icosahedra, dodecahedra, hollow polyhedral (also known as nanocages), stellated polyhedral (both regular and irregular, also known as nanostars), triangular prisms (also known as nanotriangles), hollow spherical shells (also known as nanoshells), tubes (also known as nanotubes), nanosheets, nanoplatelets, nanodisks, rods (also known as nanorods), and mixtures thereof. In the case of nanorods, the rod shape may be defined by a ratio of a rod length to a rod width, the ratio being known as the aspect ratio. For first noble metal nanoparticles of the current invention, nanorods should have an aspect ratio less than 1000, preferably less than 750, preferably less than 500, preferably less than 250, preferably less than 100, preferably less than 75, preferably less than 50, preferably less than 25. Nanorods having an aspect ratio greater than 1000 are typically referred to as nanowires and are not a shape that the first noble metal nanoparticles are envisioned as having in any embodiments.

In some embodiments, the first noble metal nanoparticles have uniform shape. Alternatively, the shape may be non-uniform. As used herein, the term "uniform shape" refers to an average consistent shape that differs by no more than 10%, by no more than 5%, by no more than 4%, by no more than 3%, by no more than 2%, by no more than 1% of the distribution of first noble metal nanoparticles having a different shape. As used herein, the term "non-uniform shape" refers to an average consistent shape that differs by more than 10% of the distribution of first noble metal nanoparticles having a different shape. In one embodiment, the shape is uniform and at least 90% of the first noble metal nanoparticles are spherical or substantially circular, and less than 10% are polygonal. In another embodiment, the shape is non-uniform and less than 90% of the first noble metal nanoparticles are spherical or substantially circular, and greater than 10% are polygonal.

In some embodiments, the first noble metal nanoparticles have a mean particle size of 40 to 130 nm, preferably 45 to 125 nm, preferably 50 to 120 nm, preferably 55 to 115 nm, preferably 60 to 110 nm, preferably 65 to 105 nm, preferably 70 to 100 nm, preferably 75 to 95 nm, preferably 80 to 90 nm. In embodiments where the first noble metal nanoparticles are spherical, the particle size may refer to a particle diameter. In embodiments where the first noble metal nanoparticles are polyhedral, the particle size may refer to the diameter of a circumsphere. In some embodiments, the particle size refers to a mean distance from a particle surface to particle centroid or center of mass. In alternative embodiments, the particle size refers to a maximum distance from a particle surface to a particle centroid or center of mass. In some embodiments where the first noble metal nanoparticles have an anisotropic shape such as nanorods, the particle size may refer to a length of the nanorod, a width of the nanorod, an average of the length and width of the nanorod. In some embodiments in which the first noble metal nanoparticles have non-spherical shapes, the particle size refers to the diameter of a sphere having an equivalent volume as the particle. In some embodiments in which the first noble metal nanoparticles have non-spherical shapes, the particle size refers to the diameter of a sphere having an equivalent diffusion coefficient as the particle.

In some embodiments, the first noble metal nanoparticles of the present disclosure are monodisperse, having a coefficient of variation or relative standard deviation, expressed as a percentage and defined as the ratio of the particle size standard deviation ($\sigma$) to the particle size mean ($\mu$) multiplied by 100 of less than 25%, preferably less than 10%, preferably less than 8%, preferably less than 6%, preferably less than 5%, preferably less than 4%, preferably less than 3%, preferably less than 2%. In some embodiments, the first noble metal nanoparticles of the present disclosure are monodisperse having a particle size distribution ranging from 80% of the average particle size to 120% of the average particle size, preferably 90 to 110%, preferably 95 to 105% of the average particle size. In some embodiments, the first noble metal nanoparticles are not monodisperse.

In general, the particle size may be determined by any suitable method known to one of ordinary skill in the art. In some embodiments, the particle size is determined by powder X-ray diffraction (PXRD). Using PXRD, the particle size may be determined using the Scherrer equation, which relates the full-width at half-maximum (FWHM) of diffraction peaks to the size of regions comprised of a single crystalline domain (known as crystallites) in the sample. In some embodiments, the crystallite size is the same as the particle size. For accurate particle size measurement by PXRD, the particles should be crystalline, comprise only a single crystal, and lack non-crystalline portions. Typically, the crystallite size underestimates particle size compared to other measures due to factors such as amorphous regions of particles, the inclusion of non-crystalline material on the surface of particles such as bulky surface ligands, and particles which may be composed of multiple crystalline domains. In some embodiments, the particle size is determined by dynamic light scattering (DLS). DLS is a technique which uses the time-dependent fluctuations in light scattered by particles in suspension or solution in a solvent, typically water to measure a size distribution of the particles. Due to the details of the DLS setup, the technique measures a hydrodynamic diameter of the particles, which is the diameter of a sphere with an equivalent diffusion coefficient as the particles. The hydrodynamic diameter may include factors not accounted for by other methods such as non-crystalline material on the surface of particles such as bulky surface ligands, amorphous regions of particles, and surface ligand-solvent interactions. Further, the hydrodynamic diameter may not accurately account for non-spherical particle shapes. DLS does have an advantage of being able to account for or more accurately model solution or suspension behavior of the particles compared to other techniques. In some embodiments, the particle size is determined by electron microscopy techniques such as scanning electron microscopy (SEM) or transmission electron microscopy (TEM).

In general, the shape description above may apply to the second noble metal nanoparticles. In some embodiments, the second noble metal nanoparticles have substantially the same shape as the first noble metal nanoparticles. In some embodiments, the second noble metal nanoparticles have a different shape from the first noble metal nanoparticles.

In some embodiments, the second noble metal nanoparticles have a mean particle size of 75 to 150 nm, preferably 80 to 145 nm, preferably 85 to 140 nm, preferably 90 to 135 nm, preferably 95 to 130 nm, preferably 100 to 125 nm, preferably 105 to 120 nm, preferably 110 to 115 nm. The particle size may be determined as described above. In some embodiments, the second noble metal nanoparticles of the present disclosure are monodisperse, having a coefficient of variation or relative standard deviation, expressed as a percentage and defined as the ratio of the particle size standard deviation ($\sigma$) to the particle size mean ($\mu$) multiplied by 100 of less than 25%, preferably less than 10%, preferably less than 8%, preferably less than 6%, preferably less than 5%, preferably less than 4%, preferably less than 3%, preferably less than 2%. In some embodiments, the second noble metal nanoparticles of the present disclosure are monodisperse having a particle size distribution ranging from 80% of the average particle size to 120% of the average particle size, preferably 90 to 110%, preferably 95 to 105% of the average particle size. In some embodiments, the second noble metal nanoparticles are not monodisperse.

The porous oxide layer comprises transition metal oxide nanoparticles. In general, the transition metal oxide nanoparticles should be semiconducting transition metal oxide nanoparticles. Any semiconducting transition metal oxide may be used, examples of which include, but are not limited to zinc oxide, titanium dioxide, copper oxide (both CuO and $Cu_2O$), tin dioxide, iron (II) oxide, nickel oxide, and mixtures thereof. Further, as used herein, transition metal oxide also refers to materials which comprise both a transition metal and oxygen and which further comprise non-transition metals, such as alkaline earth metals or alkali metals. Examples of such materials include, but are not limited to barium titanate, strontium titanate, lithium niobate, lanthanum calcium manganite, and mixtures thereof. In some embodiments, the transition metal oxide nanoparticles are zinc oxide nanoparticles. The zinc oxide may be any suitable phase of zinc oxide, such as sphalerite (cubic), matraite (trigonal), or wurtzite (hexagonal). In preferred embodiments, the zinc oxide is wurtzite zinc oxide. In some embodiments, the zinc oxide nanoparticles are crystalline by PXRD.

In general, the shape description above for the first noble metal nanoparticles may apply to the transition metal oxide nanoparticles. In some embodiments, the transition metal oxide nanoparticles have substantially the same shape as either the first noble metal nanoparticles or the second noble metal nanoparticles. In some embodiments, the transition metal oxide nanoparticles have a different shape from either of the first noble metal nanoparticles and the second noble metal nanoparticles.

In some embodiments, the transition metal oxide nanoparticles have a mean particle size of 10 to 50 nm, preferably 12.5 to 40 nm, preferably 15 to 35 nm, preferably 17.5 to 30 nm, preferably 20 to 27.5 nm, preferably 22.5 to 25 nm. The particle size may be determined as described above. In some embodiments, the transition metal oxide nanoparticles of the present disclosure are monodisperse, having a coefficient of variation or relative standard deviation, expressed as a percentage and defined as the ratio of the particle size standard deviation ($\sigma$) to the particle size mean ($\mu$) multiplied by 100 of less than 25%, preferably less than 10%, preferably less than 8%, preferably less than 6%, preferably less than 5%, preferably less than 4%, preferably less than 3%, preferably less than 2%. In some embodiments, the transition metal oxide nanoparticles of the present disclosure are monodisperse having a particle size distribution ranging from 80% of the average particle size to 120% of the average particle size, preferably 90 to 110%, preferably 95 to 105% of the average particle size. In some embodiments, the transition metal oxide nanoparticles are not monodisperse.

In some embodiments, the zinc oxide nanoparticles are present in the porous oxide layer as agglomerates. In some embodiments, the agglomerates have a mean size of 150 to 300 nm, preferably 160 to 290 nm, preferably 165 to 285 nm, preferably 170 to 280 nm, preferably 175 to 275 nm, preferably 180 to 270 nm, preferably 185 to 265 nm, preferably 190 to 260 nm, preferably 195 to 255 nm, preferably 200 to 250 nm.

The porous oxide layer has a mean pore size of 2 to 30 nm, preferably 2.5 to 27.5 nm, preferably 5 to 25 nm, preferably 7.5 to 22.5 nm, preferably 10 to 20 nm. In some embodiments, the pores are present as voids formed between adjacent zinc oxide nanoparticles. Such voids may be formed in agglomerates of zinc oxide nanoparticles.

The porous oxide layer prevents direct physical contact between the first noble metal nanoparticles and the second noble metal nanoparticles. The presence of the pores or possible spaces between agglomerates should not interfere with this contact prevention.

In some embodiments, the surface-enhanced Raman scattering (SERS) substrate comprises composite nanostructures comprising the first noble metal nanoparticles and the transition metal oxide nanoparticles. In some embodiments, the composite nanostructures further comprise the second noble metal nanoparticles. The transition metal oxide nanoparticles may be arranged on the surface of the first noble metal nanoparticles to form structures which resemble pollen grains. Such a structure may be characterized by small particles disposed upon the surface of larger particles, where each of said particles are approximately spherical. The pollen grain structure may comprise the transition metal oxide nanoparticles disposed on the surface of the first noble metal nanoparticles to form a coating which conforms to or substantially mimics or reproduces a contour of the surface of the first noble metal nanoparticles. The transition metal oxide nanoparticles are preferably of a smaller size than the first noble metal nanoparticles, such that when disposed on the surface thereof, the transition metal oxide nanoparticles form a non-smooth coating or shell around a portion of the first noble metal nanoparticles. This portion is preferably on the opposite side of the first noble metal nanoparticles from the solid support, e.g., a top hemisphere that presents a surface of convex forms (bumps) that have a height of from 0.05 to 0.5 times the average thickness of the first noble metal nanoparticles. This coating or shell can comprise a single layer of transition metal oxide nanoparticles, or may comprise multiple layers of transition metal oxide nanoparticles. The coating may have a mean thickness which is equivalent to the mean particle size of the transition metal oxide nanoparticles or a multiple thereof. Such a multiple may be equal to the number of layers of transition metal oxide nanoparticles present. In some embodiments, the second noble metal nanoparticles are disposed on the transition metal oxide nanoparticles present as part of the composite nanostructures. That is, the second metal nanoparticles are disposed on the transition metal nanoparticles in substantially the same area as, but on the other side from, the first noble metal nanoparticles. Such composite nanostructures would comprise, in a stacked arrangement, the first noble metal nanoparticles, the transition metal oxide nanoparticles, and the second noble metal nanoparticles. In such an embodiment, the first noble metal nanoparticles and the second noble metal nanoparticles may be centered above substantially the same point or portion of the solid support. Such an arrangement may be referred to as a "vertical stack". Such an arrangement is distinct from a situation in which the second noble metal nanoparticles are disposed substantially centered between adjacent first noble metal nanoparticles. The adjacent first noble metal nanoparticles may form depressions, voids, or other similar spaces in between adjacent first noble metal nanoparticles, even if such nanoparticles are touching. These depressions, voids, or other similar spaces may be carried through, translated, reconstructed, or otherwise present in the porous oxide layer. That is, such spaces may present between adjacent composite nanostructures which do not comprise the second noble metal nanoparticles. In such a situation, the second noble metal nanoparticles would be disposed between adjacent such composite nanostructures. This arrangement may be referred to as an "offset stack".

In some embodiments, the surface-enhanced Raman scattering (SERS) substrate has a band gap of greater than 3.16 eV to 3.30 eV, preferably 3.17 to 3.28 eV, preferably 3.18 to 3.26 eV, preferably 3.19 to 3.24 eV, preferably 3.20 to 3.22 eV, preferably 3.21 eV.

The present disclosure also relates to a method of forming the SERS substrate, the method comprising depositing a first noble metal film onto the solid support to form a first-coated support, annealing the first-coated support at 450 to 650° C., preferably 460 to 640° C., preferably 470 to 630° C., preferably 480 to 620° C., preferably 490 to 610° C., preferably 500 to 600° C., preferably 510 to 590° C., preferably 520 to 580° C., preferably 530 to 570° C., preferably 540 to 560° C., preferably 550° C. to form a first nanoparticle-coated support, depositing the porous oxide layer onto the first nanoparticle-coated support to form an oxide-coated support, depositing a second noble metal film onto the oxide-coated support to form a second-coated support, and annealing the second-coated support at 500 to 700° C., preferably 510 to 690° C., preferably 520 to 680° C., preferably 530 to 670° C., preferably 540 to 660° C., preferably 550 to 650° C., preferably 560 to 640° C., preferably 570 to 630° C., preferably 580 to 620° C., preferably 590 to 610° C., preferably 600° C. to form the surface-enhanced Raman scattering (SERS) substrate.

In some embodiments, the first noble metal film is deposited by DC sputtering. In some embodiments, the DC sputtering of the first film is performed with power of 10 to 50 W, preferably 15 to 45 W, preferably 20 to 40 W, preferably 25 to 35 W, preferably 27.5 to 32.5 W, preferably 30 W. In some embodiments, the second noble metal film is deposited by DC sputtering. In some embodiments, the DC sputtering of the second film is performed with a power of 75 to 125 W, preferably 80 to 120 W, preferably 85 to 115 W, preferably 90 to 110 W, preferably 95 to 105 W, preferably 100 W. In some embodiments, the zinc oxide layer is deposited by DC reactive sputtering. Such DC reactive sputtering may be performed in an oxygen-comprising atmosphere.

In some embodiments, the first noble metal film has a thickness of 30 to 60 nm, preferably 32.5 to 57.5 nm, preferably 35 to 55 nm, preferably 37.5 to 52.5 nm, preferably 40 to 50 nm, preferably 42.5 to 47.5 nm, preferably 45 nm. In some embodiments, the second noble metal film has a thickness of 20 to 50 nm, preferably 25 to 45 nm, preferably 27.5 to 40 nm, 30 to 37.5 nm, preferably 32.5 to 35 nm, preferably 34 nm.

In preferred embodiments, the first-coated support is annealed under inert atmosphere. Such an inter atmosphere may be provided by any suitable inert gas, such as nitrogen, helium, argon, neon, and the like. In preferred embodiments, the second-coated support is annealed under inert atmosphere.

FIG. 1 is an exemplary schematic diagram of a method of fabrication of a surface-enhanced Raman scattering (SERS) substrate 100. As described above, the SERS substrate 100 includes a solid support 102, first noble metal nanoparticles 104, a porous oxide layer 106 and second metal nanoparticles 108. The solid support 102 may be cleaned prior to use in the method. Such cleaning may involve cleansing with a suitable solvent, for example ethanol, acetone, deionized water, or mixtures thereof. The cleaning may take place at room temperature. The cleaning may involve ultrasonication.

A first noble metal film 110 is then deposited onto the solid support 102 to form first-coated support. In one embodiment, the first noble metal film 110 is a silver film (Ag). In an exemplary embodiment, the first noble metal film 110 is sputtered over the solid support 102 for a predefined time, such as 120 secs, in an inert atmosphere. Accordingly, the sputtering process generates a thin film 110 of the first noble metal deposited on the solid support 102.

A structure resulting from the first noble metal film 110 disposed on the solid is referred to as a first-coated support or first nanoparticle-coated support. The first-coated support is annealed at 450 to 650° C. to form a first nanoparticle-coated support as described above. The annealing process of the first-coated support may be performed for 0.25 to 4 hours, preferably 0.5 to 3 hours, preferably 0.75 to 2 hours, preferably 1 hour. In an embodiment, the annealing is performed with a heating rate of 20° C./min. The annealing may be performed under vacuum or in an inert atmosphere, for example, a nitrogen ($N_2$) environment. The annealing process converts an as-deposited first noble thin film 110 into first noble metal nanoparticles 104 disposed on the solid surface 102 to form the first nanoparticle-coated support.

In next step, a porous oxide layer 106 is deposited onto the first nanoparticle-coated support to form oxide-coated support. In an embodiment, the transition metal oxide nanoparticles 106 are zinc oxide (ZnO) nanoparticles with wurtzite crystal structure as described above.

In next step, a second noble metal film 112 is deposited onto the porous oxide layer or the oxide-coated support to form a second-coated support. As such, the second noble metal nanoparticles 108 are disposed on the porous oxide layer or ZnO—Ag layer. In an exemplary embodiment, the second noble metal film 112 is deposited on the porous oxide layer using the DC sputtering technique as described above. The current process generates a second-coated support.

The second-coated support is subjected to annealing at 500 to 700° C. to form the surface-enhanced Raman scattering (SERS) substrate 100. The annealing process of the second-coated support may be performed as described above. The annealing process converts the second noble metal film 112 into second noble metal nanoparticles 108 disposed on the porous oxide layer 106.

The present disclosure also relates to a method of obtaining a Raman spectrum of an analyte, the method comprising depositing the analyte onto the surface-enhanced Raman scattering (SERS) substrate to form a sample, exposing the sample to laser light such that a portion of the laser light is scattered by the sample to form scattered light, and detecting the scattered light. In some embodiments, the analyte contacts at least one selected from the group consisting of the first noble metal nanoparticles, the porous oxide layer, and the second noble metal nanoparticles. In some embodiments, the analyte contacts the porous oxide layer and the second noble metal nanoparticles.

In some embodiments, the laser light has a wavelength of 522 to 542 nm, preferably 524 to 540 nm, preferably 526 to 538 nm, preferably 528 to 536 nm, preferably 530 to 534 nm, preferably 532 nm. In some embodiments, the SERS substrate has an enhancement factor of greater than $1.1 \times 10^6$ to $5.9 \times 10^6$, preferably $1.25 \times 10^6$ to $5.75 \times 10^6$, preferably $1.5 \times 10^6$ to $5.5 \times 10^6$, preferably $1.75 \times 10^6$ to $5.25 \times 10^6$, preferably $2.0 \times 10^6$ to $5.0 \times 10^6$, preferably $2.25 \times 10^6$ to $4.75 \times 10^6$, preferably $2.5 \times 10^6$ to $4.5 \times 10^6$, preferably $2.75 \times 10^6$ to $4.25 \times 10^6$, preferably $3.0 \times 10^6$ to $4.0 \times 10^6$, preferably $3.25 \times 10^6$ to $3.75 \times 10^6$, preferably $3.5 \times 10^6$.

The examples below are intended to further illustrate protocols for preparing, characterizing, and using the SERS substrate and are not intended to limit the scope of the claims.

Where a numerical limit or range is stated herein, the endpoints are included. Also, all values and subranges within a numerical limit or range are specifically included as if explicitly written out.

Obviously, numerous modifications and variations of the present invention are possible in light of the above teachings. It is therefore to be understood that, within the scope of the appended claims, the invention may be practiced otherwise than as specifically described herein.

Examples

Materials and Method

Pollen Grain like nanostructures (PGNSs) were fabricated on glass substrates in three different steps. All the metal targets, Ag, Zn and Au (99.995% purity) of 2 inch diameter were purchased from ACI alloy Inc. and used without any modification. All the depositions were carried out using DC sputtering technique (model: Nanomaster NSC4000, USA). Prior to the depositions, all glass substrates were sonicated with ethanol, acetone and deionized water at room temperature. Firstly, Ag target was utilized to deposit Ag thin film on glass substrates with the Ar flow rate of 70 SCCM. In addition, the Ag target was pre-sputtered for 120 secs in an argon (Ar) atmosphere at the flow rate of 70 SCCM. The base pressure, working pressure deposition power and deposition time were maintained to $1.7 \times 10^{-5}$ torr, $2.8 \times 10^{-3}$ torr, 30 W, and 45 secs respectively. In-built thickness monitoring system confirmed the thickness of Ag film of ~45 nm. As-deposited films were transferred immediately to a tubular furnace (model: MTI Corporation OTF-1200X) to treat the samples at 550° C. for 1 hr with a heating rate of 20° C./min under nitrogen ($N_2$). This step aims to convert the as deposited Ag thin film to Ag NPs. In the second step, the Ag NPs were decorated with ZnO (called hereafter ZnO—Ag). As-fabricated Ag NPs specimen was taken back again to the sputtering chamber, where the base pressure, working pressure, deposition power and deposition time were maintained to $1.0 \times 10^{-5}$ torr, $3.5 \times 10^{-3}$ torr, 100 W and 15 mins respectively. In this step, Zn target was utilized to deposit ZnO with the Ar flow rate of 50 SCCM and the $O_2$ flow rate of 20 SCCM. ZnO film thickness was recorded to be ~61 nm by in-built thickness monitoring system. In the final step, the Au was deposited on ZnO—Ag with the Ar flow rate of 70 SCCM. The DC power, base pressure, working pressure, and deposition time were maintained to 30 W, $5.0 \times 10^{-5}$ torr, $3 \times 10^{-3}$ torr and 30 s respectively. Au film thickness was recorded to be ~34 nm by in-built thickness monitoring system. The as-fabricated Au film-decorated ZnO—Ag was immediately transferred to the same tubular furnace for sintering at 600° C. for 1 hr under $N_2$ with a heating rate of 20° C./min and to convert Au layer into Au NPs.

UV-vis absorption analyses of as-fabricated nanostructures were carried out using JASCO UV-VIS-NIR Spectrophotometer (V-670) measurement system. The structural properties of the nanostructures were identified using X-ray diffraction (XRD, Rigaku MiniFlex, Japan) with Cu Kα radiation (λ=0.154178 nm) at 40 kV and 40 mA with the diffraction angle range $10° \leq 2\theta \leq 60°$. The surface chemical composition was investigated via X-ray Photoelectron Spectroscopy (XPS, ESCALAB250Xi, Thermo Fisher Scientific, USA). Detailed topographic investigations were carried our through Field emission scanning electron microscopy (FE-SEM, Tescan Lyra-3, Czech Republic) equipped with energy-dispersive spectroscopy (EDS) to obtain the FESEM and EDS images.

SERS-activity was elucidated and validated using Raman-active dye Rhodamine 6G (R6G, $C_{28}H_{31}N_2O_3Cl$). R6G was used as received from Chroma Gesellschaft Schmid GMBH & Co. To confirm the SERS-activity, as-fabricated PGNSs, ZnO—Ag and Au were incubated by R6G dye of $1 \times 10^{-6}$ M for ca. 10 mins and thereafter rinsed by DI water several times. SERS measurements of the R6G dye adsorbed PGNSs, ZnO—Ag and Au were performed using LabRAM HR Evolution Raman microspectrometer system (30-4000 cm$^{-1}$). Internally aligned He—Ne laser (Melles, 633 nm) of 17 mW was filtered to 25% to avoid dissociation and damage to the sample. Long working distance lens (50×) was used to focus the excitation on the sample and scattered photon was collected in backscattering configuration for 10 sec. and accumulation of 2 at a grating of 600 lines/mm. The laser was turned off immediately after the signal collection. For the excitation of 532 nm, air-cooled solid state laser kits of 100 mW was used along with the same conditions that were used for 632.8 nm laser excitation.

EM near-field distributions are considered as a crucial and deterministic factor in SERS study. Therefore, a typical model resembling PGNSs was designed and simulated by Planc FDTD (ver. 6.2). The model was designed in such a way so that it resembles to the nanostructures to some extent. The dimension and feature of the selected model were chosen to facilitate an insight how EM near-field distributions get induced because of excitation at different polarizations. Following the FESEM observations and underlying size distributions as shown in FIGS. 2A-2F and FIGS. 3A-3E, the dimeters of Ag, ZnO and Au NP in abovementioned model was chosen to be 90, 24 and 115 nm respectively. To simplify the FDTD simulations, a layer of interacting ZnO NPs over an isolated Ag NP was modeled followed by another Au NP atop along ZX (Y=0) plane. Excitation wavelength was chosen to be 532 nm based on experimentally obtained absorption band of PGNSs under this investigation as well as enhanced SERS spectra as shown in FIG. 4 and FIG. 7. Further insight of EM near-field distributions was extracted in three different plans, such as XY (Z=0)-, YZ (X=0)- and ZX (Y=0)-planes simulated at s-, p- and 45° of incident polarizations.

Topographic Analysis

Figure 2B:
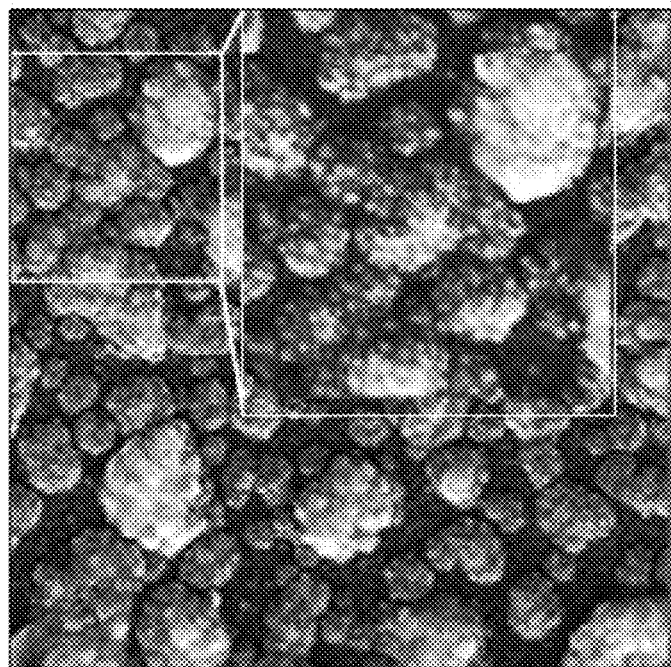
FIG. 2B illustrates a high resolution FESEM micrograph of ZnO—Ag layer, according to certain embodiments.
Figure 2A:
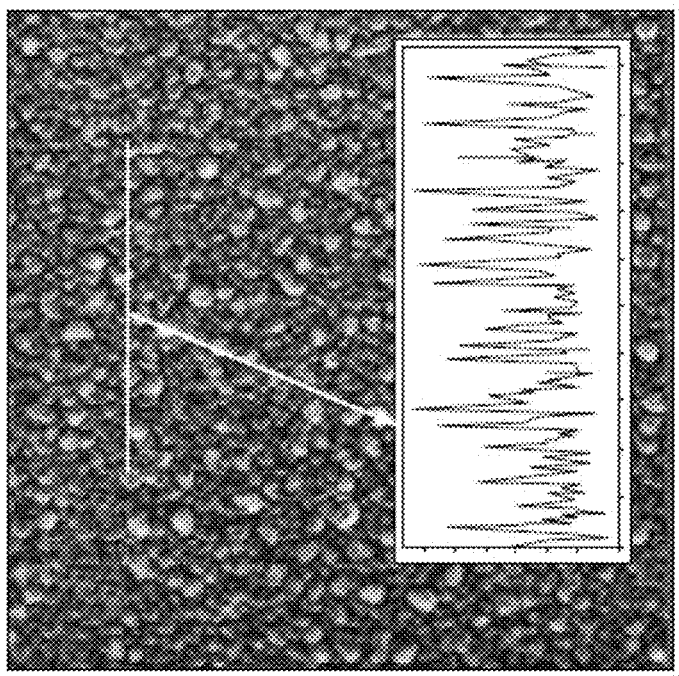
FIG. 2A illustrates a typical field emission scanning electron microscope (FESEM) micrographs of ZnO—Ag and respective energy dispersive spectroscopy (EDS) to confirm elemental composition along with line profile of various particles and layers, according to certain embodiments.
Figure 2C:
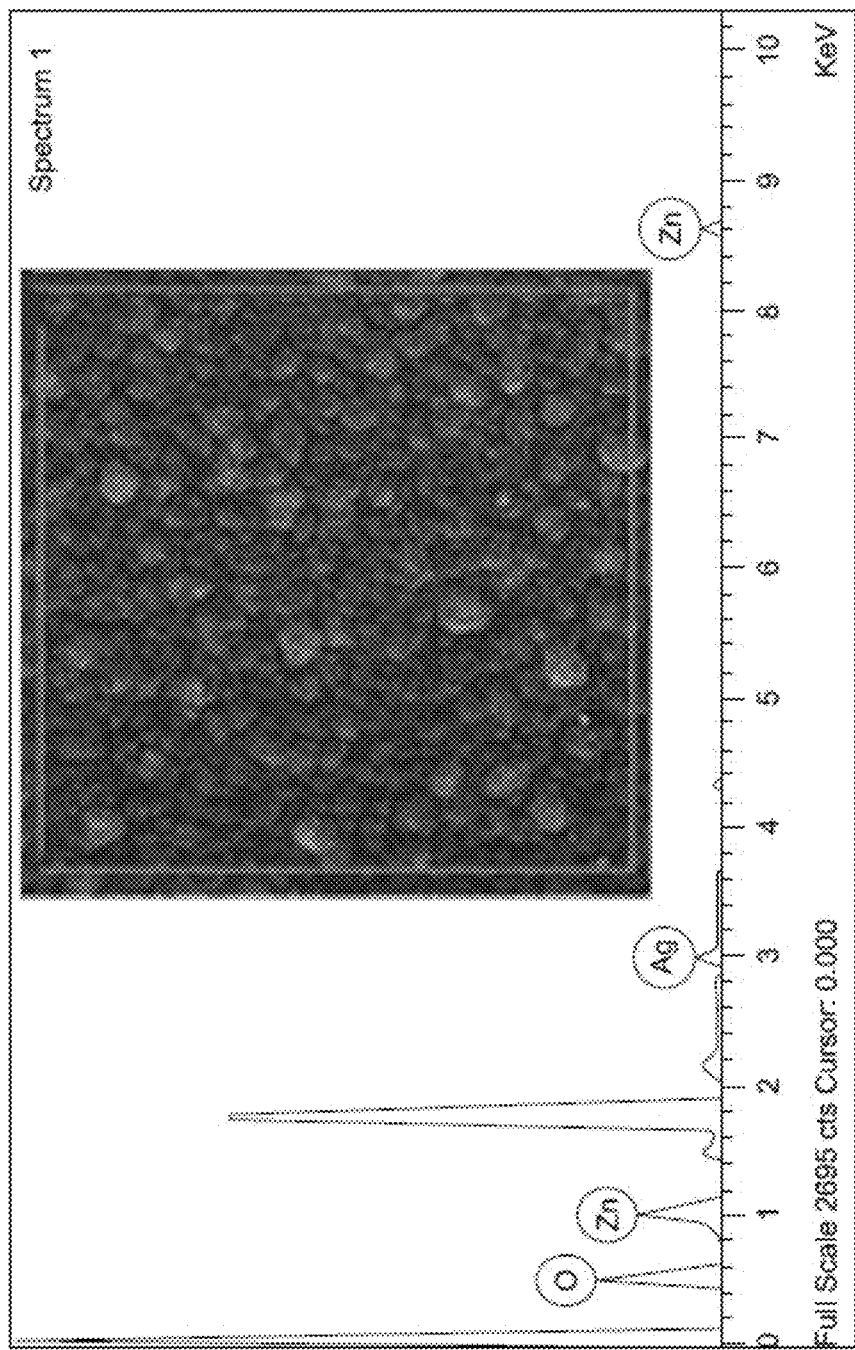
FIG. 2C illustrates elemental compositions of the ZnO—Ag layer, according to certain embodiments.

FIGS. 2A-2F represent typical SEM micrographs of as-fabricated ZnO—Ag, PGNSs and respective EDS to confirm elemental composition. As stated in experimental section, the Ag NPs were found to be coated with small ZnO clusters after the treatment and such nanostructures are shown in FIGS. 2A-2B. A line scan profile along the white dashed line amended therein shown in inset of FIG. 2A. The line scan revealed that such ZnO—Ag were indeed of different sizes and shapes. A high resolution SEM micrograph of the same ZnO—Ag are shown in FIG. 2B. Instead of smooth ZnO thin coating, Ag NPs were observed to be coated with ZnO clusters. A zoom in view of 1 μm×1 μm area as shown in FIG. 2B by dotted square was further represented in FIG. 2B. To confirm the elemental compositions of the same ZnO—Ag specimen, SEM-aided EDS was carried out for a selected area. The spectrum and selected area are both shown in FIG. 2C. EDS peaks for Zn were clearly observed at 1.01 eV (Lα) and 8.63 eV (Kα) whereas those for Ag and O were at 2.98 eV (Lα) and 0.53 eV (Kα) respectively.

Figure 2E:
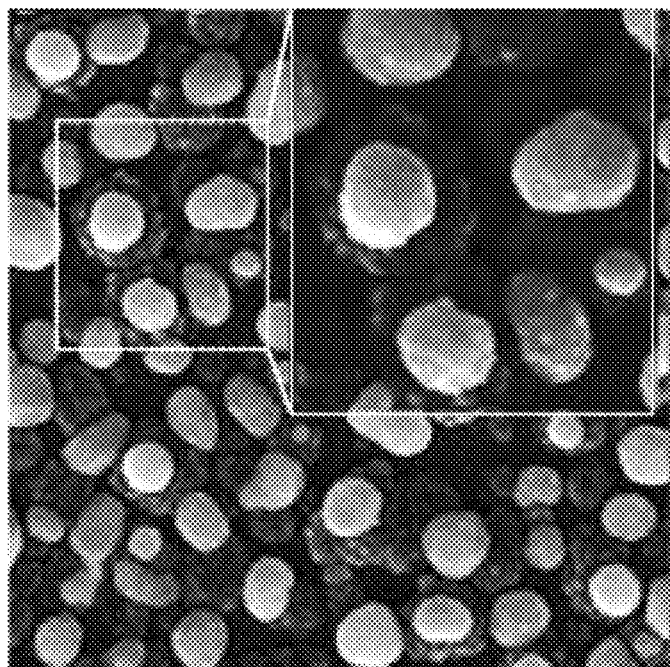
FIG. 2E illustrates a high resolution FESEM micrograph of the fabricated PGNSs, according to certain embodiments.
Figure 2D:
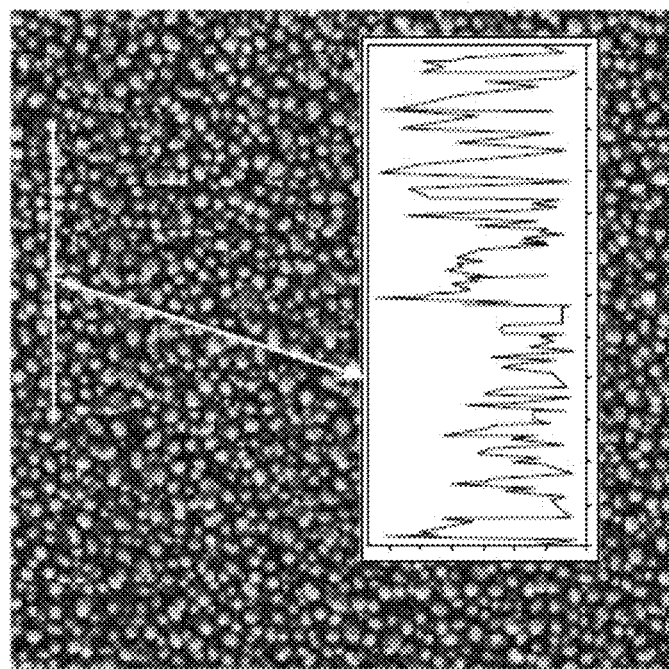
FIG. 2D illustrates FESEM micrographs of fabricated PGNS and respective EDS for elemental composition along with line profiles of various particles and layers, according to certain embodiments.
Figure 2F:
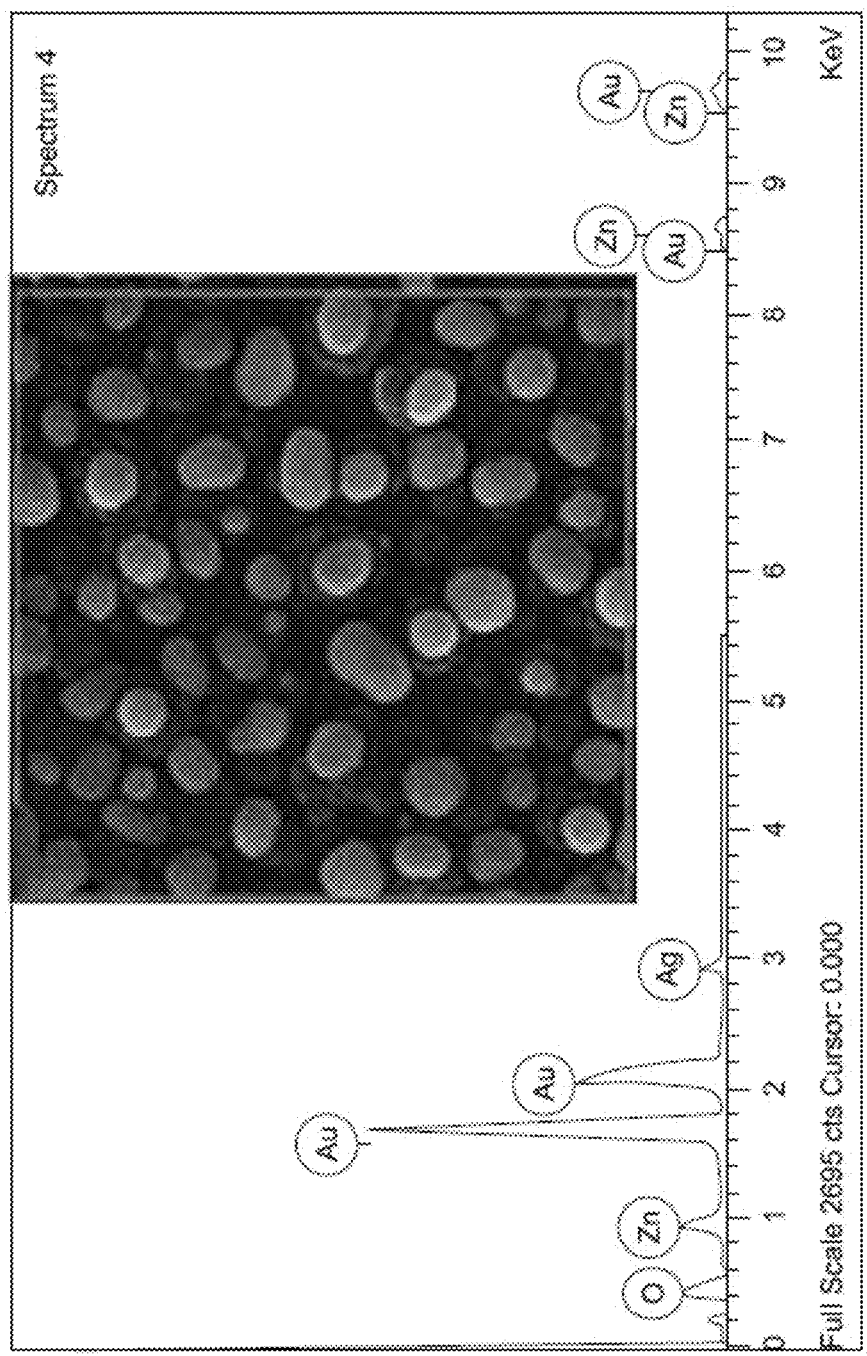
FIG. 2F illustrates scanning electron microscope (SEM)-aided EDS of the PGNS, according to certain embodiments.

FIG. 2D represents SEM micrograph of the same nanostructures. A line profile along the white dashed line indicated therein is shown FIG. 2D. Most of the spikes showed a shoulder that represent position of Au NPs on ZnO—Ag. A high resolution SEM micrograph of the same PGNSs are shown in FIG. 2E. A further enhanced view of 1 μm×1 μm area is shown in FIG. 2E and denoted by the dotted square. FIG. 2F represents SEM-aided EDS of the same PGNSs and indicates the presence of Zn, O, Au and Ag. EDS peaks of Zn were found to be at 1.01 eV (Lα) and 8.63 eV (Kα) and that of Au were at 2.12 eV (Lα) and 9.71 eV (Kα). As for Ag and O, the EDS peaks were found to be at 2.98 eV (Lα) and 0.53 eV (Kα) respectively.

Figure 3A:
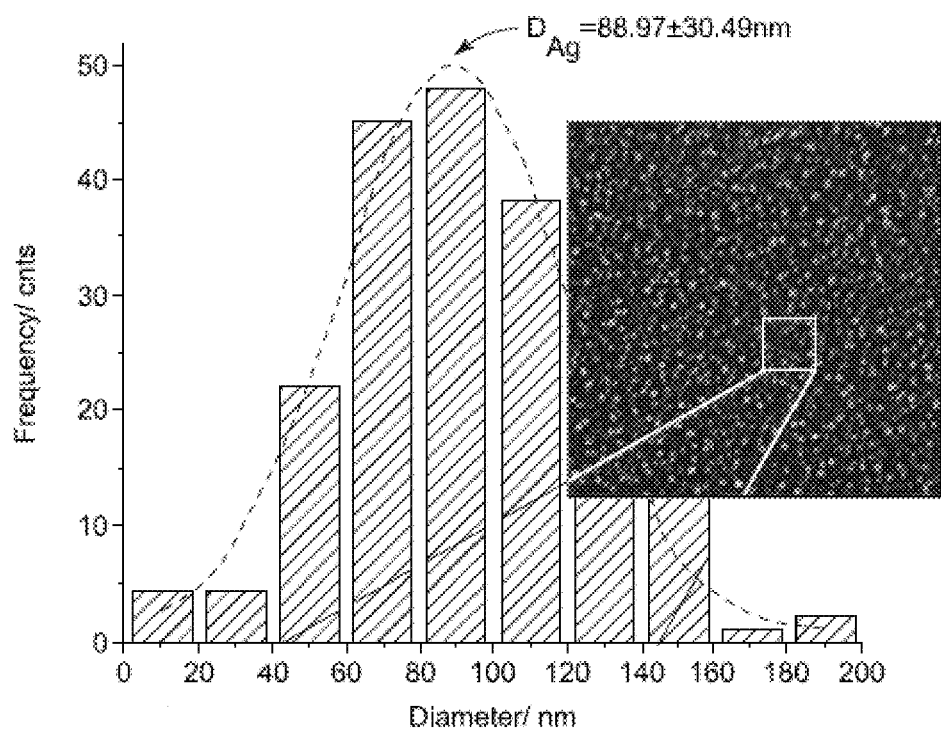
FIG. 3A illustrates a histogram of size distribution profile of Ag NPs, according to certain embodiments.
Figure 3B:
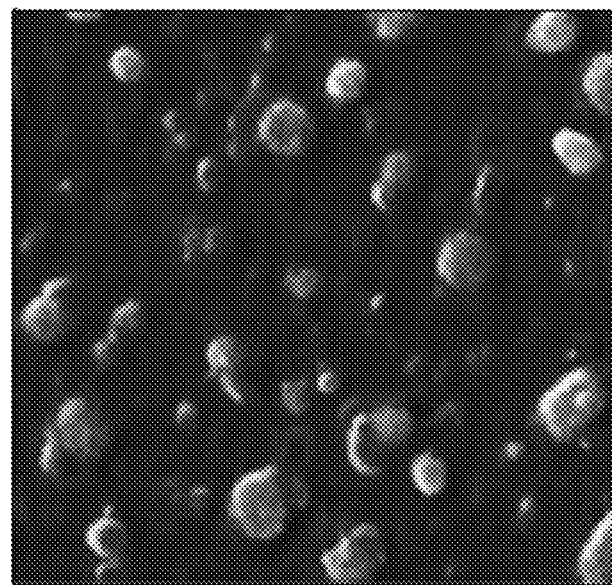
FIG. 3B is an SEM image of the area used to generate the histogram in FIG. 3A.
Figure 3C:
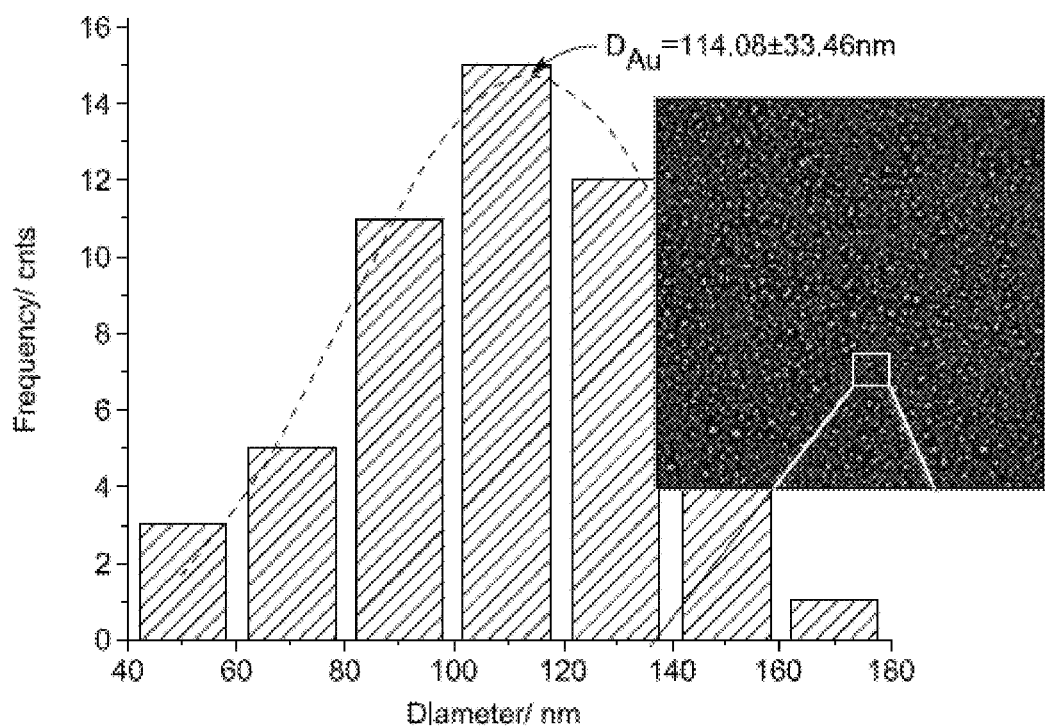
FIG. 3C illustrates a histogram of size distribution profile of Au NPs, according to certain embodiments.
Figure 3D:
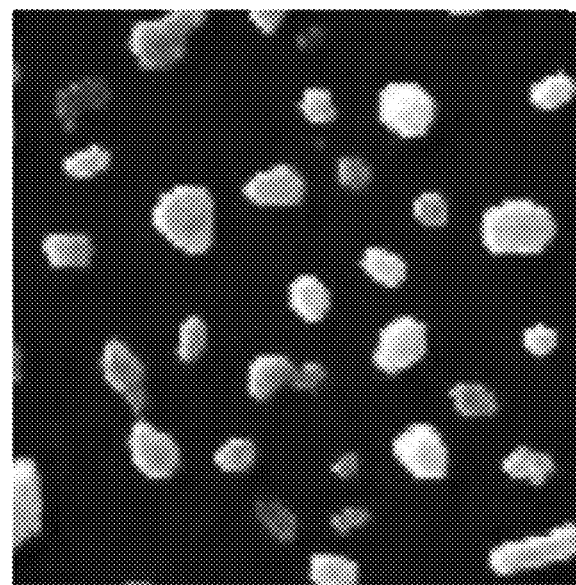
FIG. 3D is an SEM image of the area used to generate the histogram in FIG. 3C.
Figure 3E:
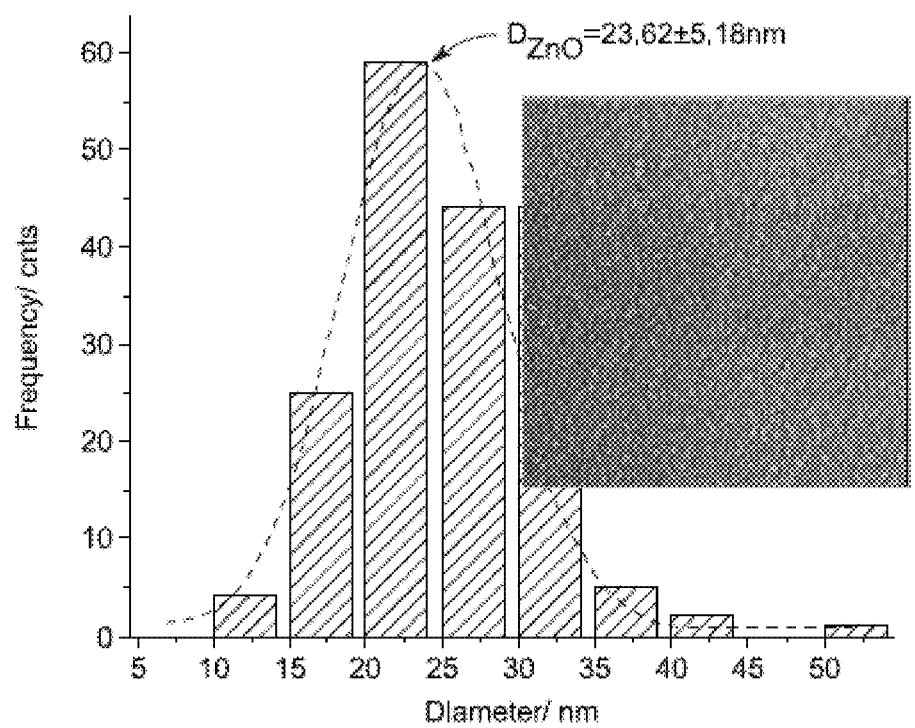
FIG. 3E illustrates a histogram of size distribution profile of ZnO NPs, according to certain embodiments.

Additional specimens, Ag film, Au film and ZnO film collected at the intermediate stages, were prepared and treated simultaneously under same conditions to understand the evolution of detailed morphology as well as to amend the characteristics values in simulations. The details of the simulation results will be discussed below. As-fabricated Ag NPs were observed to be different shapes and sizes after the treatment under same conditions. Based on more than 150 events as observed in a SEM micrograph (shown in FIG. 3A), a histogram was obtained to figure out the size distribution of such Ag NPs. As shown in FIG. 3A, a relatively broadened size distribution, 88.97±30.49 nm using the Gaussian fit (in red) was measured. A broadened full width at half maximum (FWHM) of 30.49 nm indicated that as-fabricated Ag NPs were of wide size distribution. An image of the area used to calculate the histogram is shown in FIG. 3B. FIG. 3C shows a histogram of Au NPs size distribution, 114.08±33.46 nm along with the Gaussian fit (in red). The FWHM of 33.46 nm in such case was found to be similar to that obtained in that of Ag NPs. A zoom in view of the selected area (5×5 μm$^2$) marked by white dotted square therein was shown in FIG. 3BD As explained above, during the treatment, ZnO film turned into small ZnO clusters and such clusters coated Ag NPs in the process. Based on more than 150 events as observed in a SEM micrograph (FIG. 3E), a histogram was obtained to understand the size distribution of such ZnO NPs. As shown in FIG. 3E, a relatively narrow size distribution, 23.62±5.18 nm using the Gaussian fit (in red) was measured. Contrary to those obtained in case of Ag and Au NPs, FWHM of 5.18 nm indicated that as-fabricated ZnO NPs were of narrow size distribution.

Optical Characterization

Figure 4B:
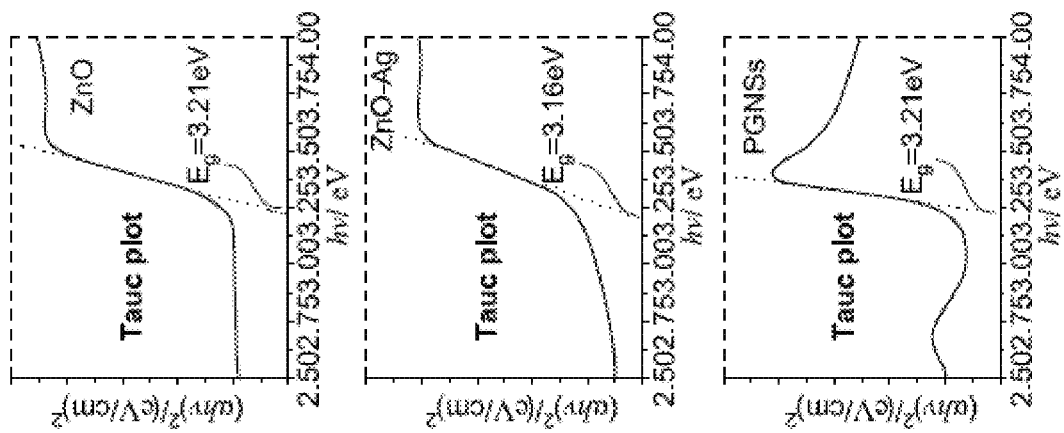
FIG. 4B illustrates Tauc plots obtained from the UV-vis adsorption spectra.
Figure 4A:
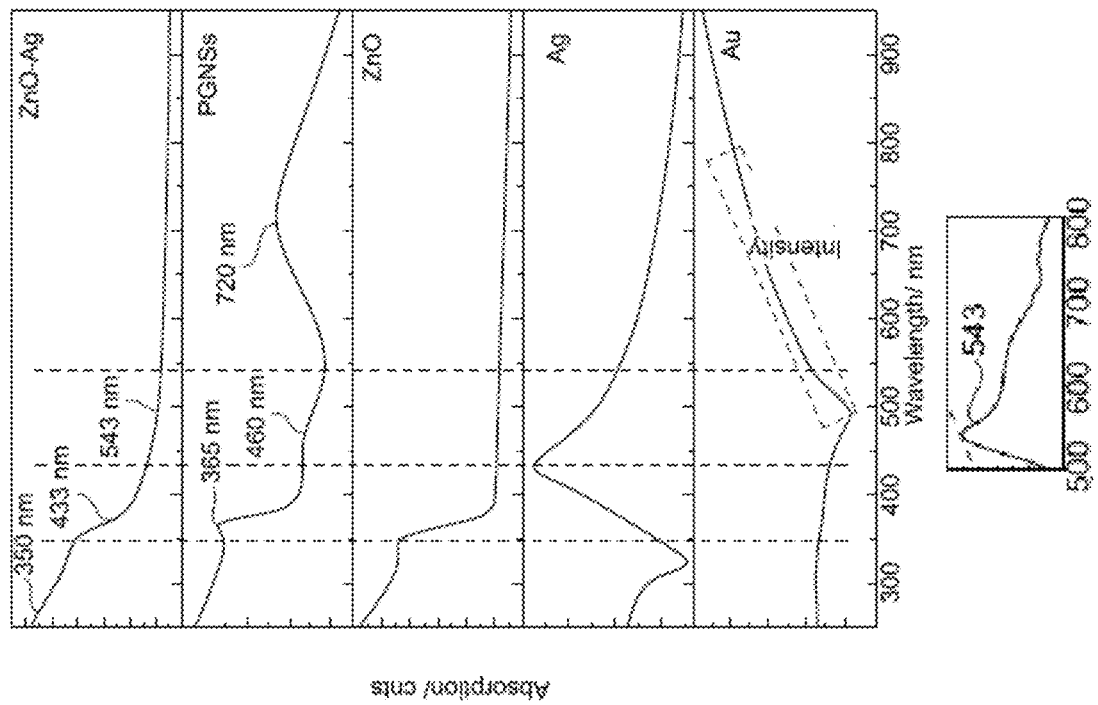
FIG. 4A illustrates an UV-vis absorption spectra of ZnO—Ag, PGNSs, ZnO, Ag and Au nanoparticles, according to certain embodiments.

The UV-vis absorption spectra of as-fabricated samples were obtained and compared over a wavelength range from 250 nm to 950 nm as displayed in FIGS. 4A-4B. FIG. 4A shows UV-vis spectra of ZnO—Ag, PGNSs, ZnO, Ag and Au. For the convenience of locating peak positions vertical dashed lines were inserted. These red vertical lines indicate 350, 433 and 543 nm that correspond to the absorption peaks of ZnO, Ag and Au specimens [Xu, G., et. al., Advanced Materials, 2012, 24, 10, OP71-OP76; Barman, B., et. al., Advances in Natural Sciences: Nanoscience and Nanotechnology, 2017, 8, 3, 035010; Drmosh, Q. A., et. al., Journal of Materials Science: Materials in Electronics, 2015, 26, 1, 139-148; and Fageria, P., et. al., Rsc Advances, 2014, 4, 48, 24962-24972, each of which is incorporated herein by reference in its entirety]. Although peaks for ZnO and Ag specimens were distinct, for the Au specimen, a shallow peak at 543 nm was observed. A zoom in view of the selected area marked by dotted rectangle is shown therein confirming the bad position at 543 nm for Au. For ZnO—Ag specimen, the peak position for ZnO remained almost same, although peak for Ag was found diminished. Compared to the ZnO sample, the absorption band for ZnO was found broadened because of the presence of Ag. However, as for PGNSs, all the three peaks of ZnO, Au and Ag were found distinct with an exception that peak positions had been red shifted. The peaks for ZnO, Ag and Au for PGNSs were observed at 365, 460 and 720 nm respectively. Such absorption peak shifting is mainly known due to the plasmon interaction between adjacent NPs [Minn, N. A., & Halas, N. J., Nano letters, 2009, 9, 3, 1255-1259; and Hossain, M. K., et. al., The Journal of Physical Chemistry C, 2009, 113, 27, 11689-11694, each of which is incorporated herein by reference in its entirety].

Band gaps of the various samples were determined using Tauc plots as shown in FIG. 4B. The band gap of the ZnO specimen was found to be 3.21 eV, whereas the ZnO—Ag specimen exhibited a slightly lower shifted band gap of 3.16 eV. In case of PGNSs, however, the band gap had been restored to 3.21 eV.

Structural Characterization

Figure 5:
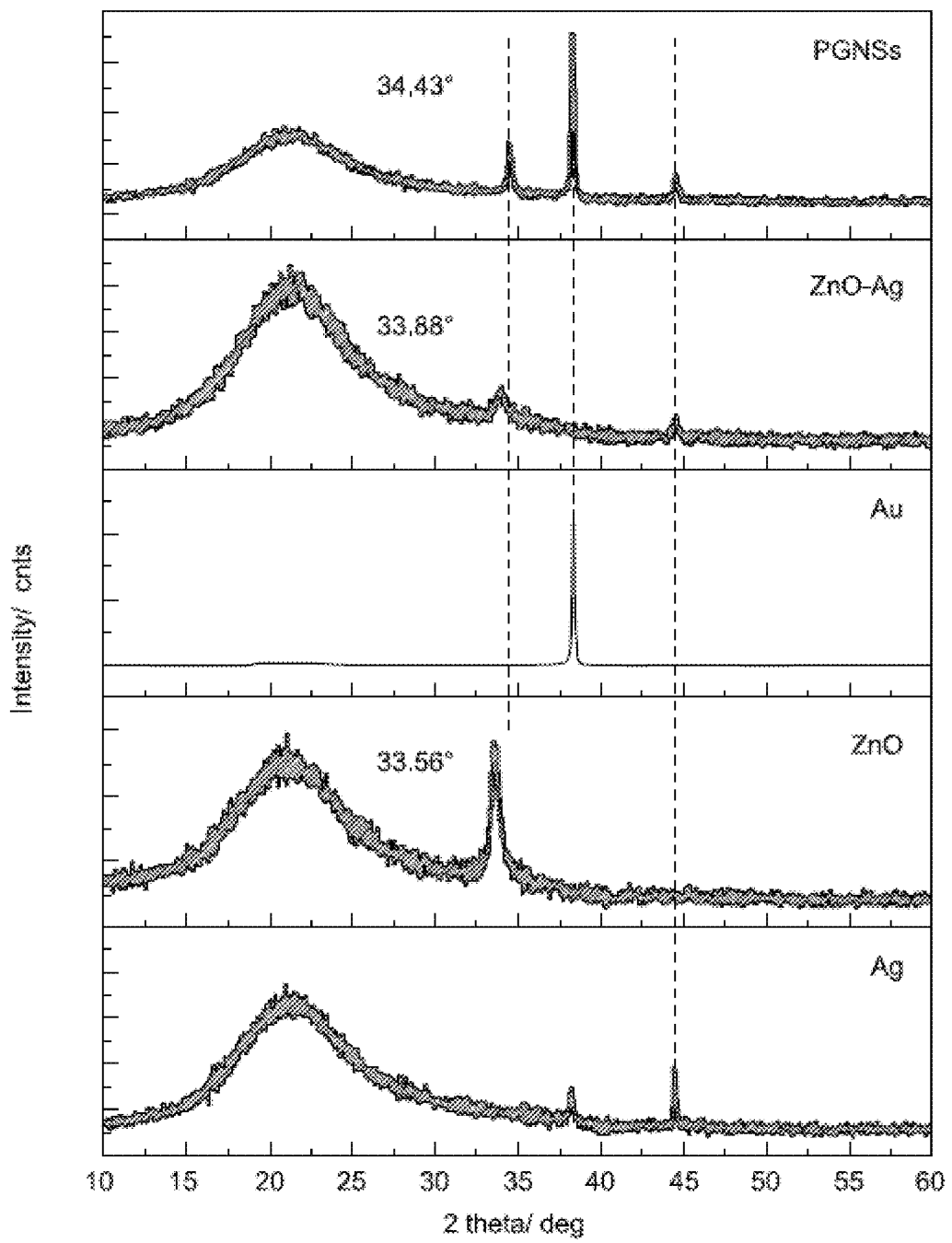
FIG. 5 illustrates the XRD patterns for structural properties and crystallographic information of the PGNSs specimen, ZnO sputtered Ag NPs, the Au NPs, the ZnO NPs, and the Ag Nps, according to certain embodiments.

The structural properties and crystallographic information of Ag, ZnO, Au, ZnO—Ag, and PGNSs specimens were studied by XRD. As displayed in FIG. 5, the two diffraction peaks of Ag NPs at 38.20°, and 44.28° can be ascribed to the {121}, and {200} diffraction planes of face centered cubic of Ag, respectively. The diffraction pattern of as-deposited ZnO thin film showed a distinct peak at 33.56°, indicating that the sputtered ZnO film had the wurtzite crystal structure, and was highly c-axis oriented. This preferential orientation has been observed in the literature and is typically attributed to the lower surface free energy needed for the growth of the {002} plane compared to those needed for other planes [Kim, S. H., et. al., Journal of Alloys and Compounds, 2017, 698, 77-86; Rahmane, S., et. al., Superlattices and Microstructures, 2015, 79, 148-155; and Hossain, M. K., et. al., Applied Physics A, 2014, 117, 2, 459-465, each of which is incorporated herein by reference in its entirety]. Similarly, the XRD pattern of Au NPs showed one sharp peak at 38.02°, which can be indexed to {111} reflection of face centered cubic of Au. The strong growth of the Au in {111} direction could be ascribed to the fact that isolated Au NPs attempt to minimize their internal free energy during the conversion from film to NPs. The XRD patterns of ZnO sputtered on Ag NPs film showed two peaks at 33.88° and 44.47°, matching with treated ZnO {002}, and Ag {200} diffraction peaks, respectively. Nevertheless, the {121} diffraction peak of Ag was not detected in this sample, which could be due to its low intensity compared with other peaks. The XRD analysis of the PGNSs specimen showed three peaks at 34.43°, 38.30°, and 44.57°, which were indexed to the {002} of treated ZnO, {200} of Ag, and {111} of Au, respectively. The presence of Au, ZnO peaks along with that for Ag in PGNSs specimen confirmed that the Au NPs were successfully loaded on the nanostructured ZnO—Ag system. A slight deviation to the right at the position of {002} peak of ZnO in ZnO—Ag and PGNSs is due to the thermal treatment and has been reported previously [see Drmosh, Q. A., et. al., Journal of Materials Science: Materials in Electronics, 2015, 26, 1, 139-148; and Fageria, P., et. al., Rsc Advances, 2014, 4, 48, 24962-24972].

XPS Characterization

Figure 6A:
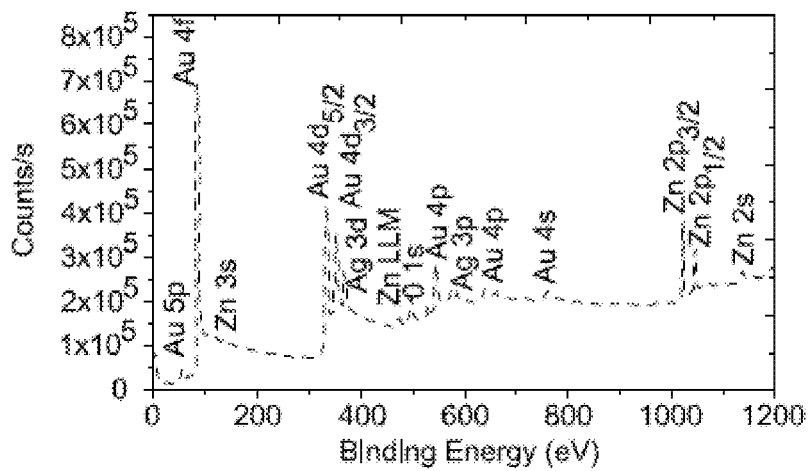
FIG. 6A illustrates a chemical state and electronic structure of the elements in the PGNSs specimen through X-ray photoelectron spectroscopy (XPS) spectrum, according to certain embodiments.
Figure 6B:
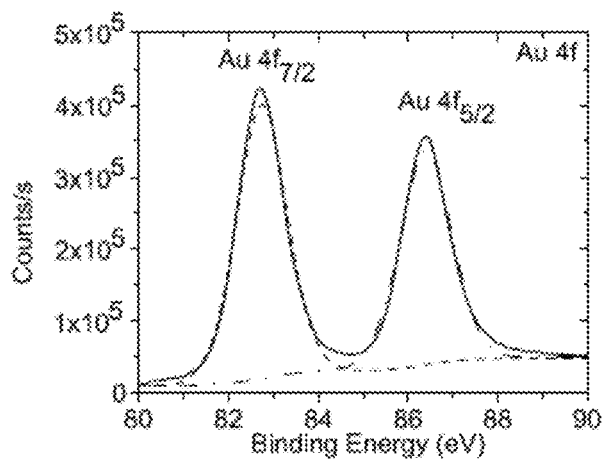
FIG. 6B illustrates XPS peaks of Au $4f_{7/2}$ and Au $4f_{5/2}$, according to certain embodiments.
Figure 6C:
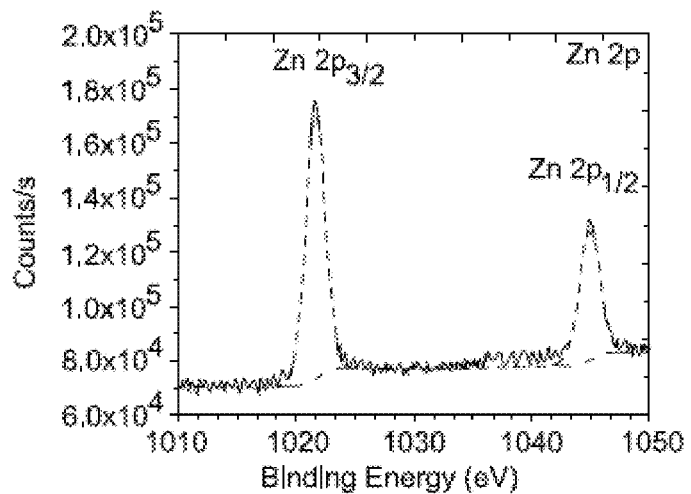
FIG. 6C illustrates the XPS peaks of Zn $4_{3/2}$ and Zn $2p_{1/2}$, according to certain embodiments.
Figure 6D:
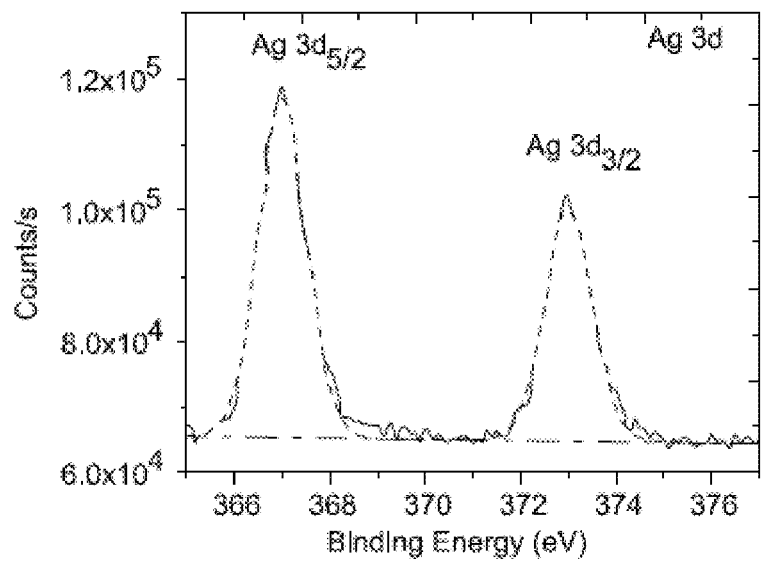
FIG. 6D illustrates a Gaussian-resolved XPS peaks for Ag spectrum, according to certain embodiments.
Figure 6E:
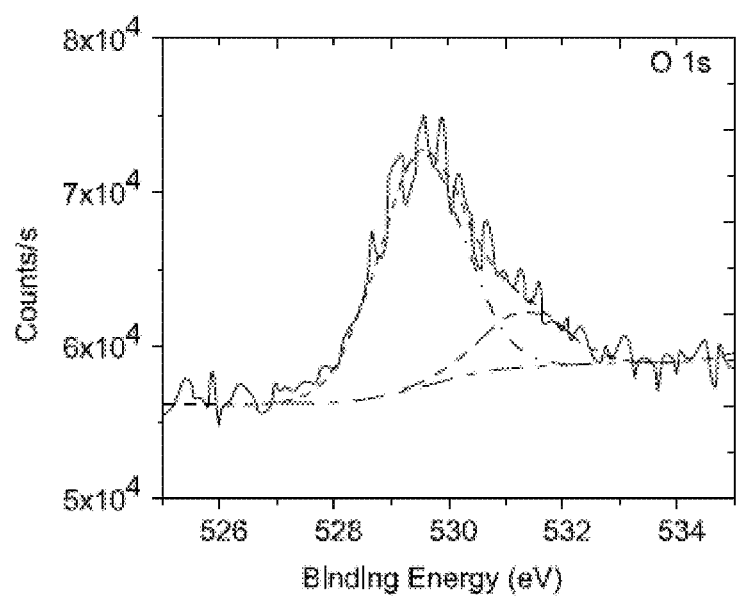
FIG. 6E illustrates the XPS peak for 0 is spectrum, according to certain embodiments.

The chemical state and electronic structure of the elements in the PGNSs specimen were investigated by XPS and the results are shown in FIG. 6A-6E. As can be seen in FIG. 6A, the survey XPS spectrum showed the presence of Zn, Au, Ag, O and C. The XPS peaks of Au 4f5/2 and Au 4f5/2 were positioned at around 82.69, and 86.40 eV respectively as shown in FIG. 6B. XPS peaks slightly shifted to lower binding energy from that of bulk Au, could be ascribed to electron transfer between ZnO and Au [Gogurla, N., et. al., Nanotechnology, 2013, 24, 34, 345202; Choudhary, M. K., et. al., ACS Applied Nano Materials, 2018, 1, 4, 1870-1878; and Shao, Z., et. al., International Journal of Photoenergy, 2020, Article ID 2456968, each of which is incorporated herein by reference in its entirety]. The high resolution spectrum of Zn 2p as shown in FIG. 6C consisted of two peaks and located at 1021.61, and 1044.89 eV, which can be indexed to Zn 2p5/2, and Zn 2p5/2, respectively, and attributed to $Zn^{2+}$ in wurtzite ZnO [Wang, Y., et. al., Journal of hazardous materials, 2020, 381, 120944, incorporated herein by reference in its entirety]. The Gaussian-resolved result for the Ag spectrum in shown in FIG. 6D displays two peaks positioned at 366.99 eV and 372.92 eV, which can be ascribed to Ag 3d5/2 and Ag 3d3/2, respectively. As shown in FIG. 6E, the O 1 s spectrum represented two peaks at 529.52, and 531.29 eV which can be ascribed to lattice oxygen in ZnO lattice and surface adsorbed oxygen, respectively.

Surface-Enhanced Raman Spectroscopy Characterization

Figure 7B:
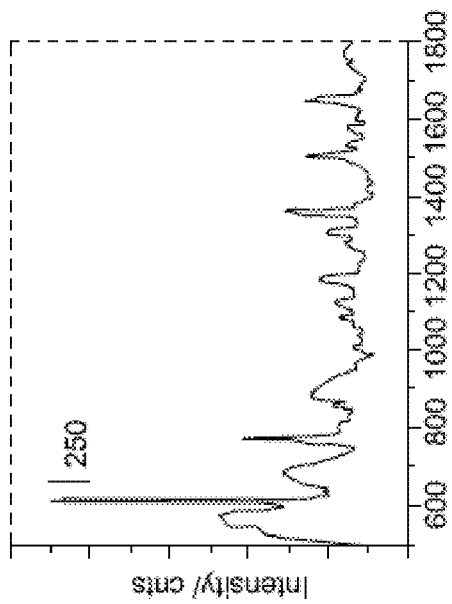
FIG. 7B shows a zoom in view of the selected area of the spectrum as marked by dashed rectangle in FIG. 7A.
Figure 7C:
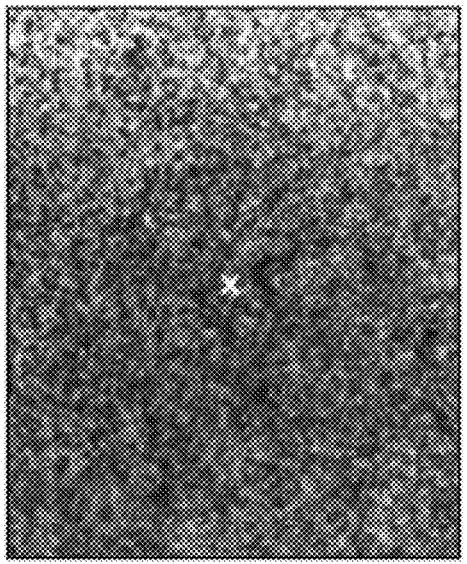
FIG. 7C shows a CCD image of the specimen along with the focused spot marked by white "x" used to obtain the SERS spectra.
Figure 7A:
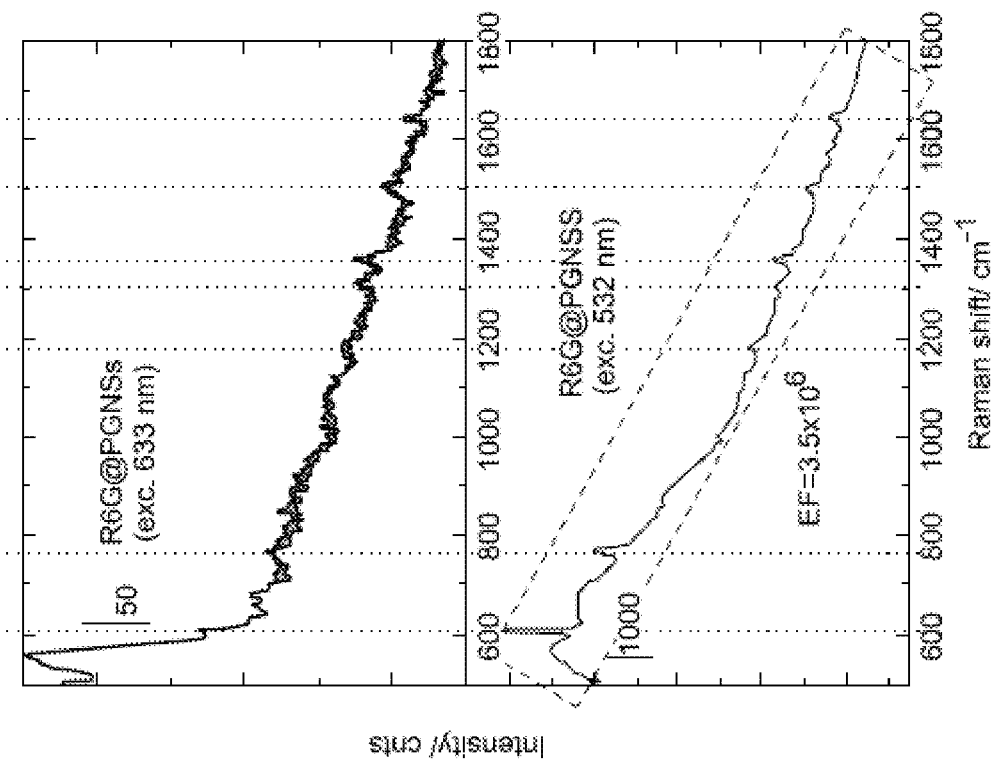
FIG. 7A illustrates SERS spectra of a Rhodamine 6G dye absorbed over PGNS substrate and excited at 633 nm and 532 nm wavelength, according to exemplary embodiments.

As mentioned above, in SERS measurements, two enhancement mechanisms are mainly known: chemical enhancement (CE mechanism) and electromagnetic enhancement (EM mechanism). CE mechanism is related to molecular polarizability whereas EM mechanism depends on the distribution of localized EM-field. It is well-known in SERS that the EM mechanism is typically dominant and contributes to giant enhancement as high as $10^6$. FIG. 7A shows SERS spectra of R6G adsorbed on PGNSs excited by 633 nm (upper panel) and 532 nm (lower panel). A zoom in view of selected area of the spectrum as marked by dashed rectangle and obtained at 532 nm excitation was shown in of FIG. 7B. FIG. 7C represents a CCD image of the same specimen along with the focused spot marked by white "x" used to obtain the SERS spectra. No damage or dissociation of R6G dyes was observed due to very low intensity and exposure of laser excitation. As mentioned in experimental section, the laser was turned off immediately after the measurement and the optical path was readjusted for another laser excitation without changing the focusing spot on the same specimen. This is very critical point to maintain, as a tiny difference in nanometric scale in geometry makes a huge difference in SERs enhancement. Therefore, focusing spot was kept unchanged during the SERS measurements, even for two different excitations. Red vertical dashed lines were inserted to facilitate the readers to follow SERS peaks obtained in both cases. SERS bands observed under this investigation are tabulated in Table 1 along with corresponding band assignments that coincided well with the reported SERS peaks of R6G [2. Hossain, M. K., et. al., Analytical and bioanalytical chemistry, 2009, 394, 7, 1747-1760; Hossain, M. K., & Ozaki, Y., Current Science, 2009, 97, 2, 00113891; and Hossain, M. K., Materials Science Forum, 2013, Vol. 754, pp. 143-169, each of which is incorporated herein by reference in its entirety]. All the bands were observed in both excitations with an exception that the band intensity was lower in case of 633 nm with reference to those observed at 532 nm. It is noteworthy that SERS spectrum obtained at 532 nm excitation was having strong fluorescence background compare to that obtained at 633 nm [Hossain, M. K., et. al., Physical Chemistry Chemical Physics, 2009, 11, 34, 7484-7490, incorporated herein by reference in its entirety]. In such case, the EF was estimated to be $3.5 \times 10^6$.

Figure 7E:
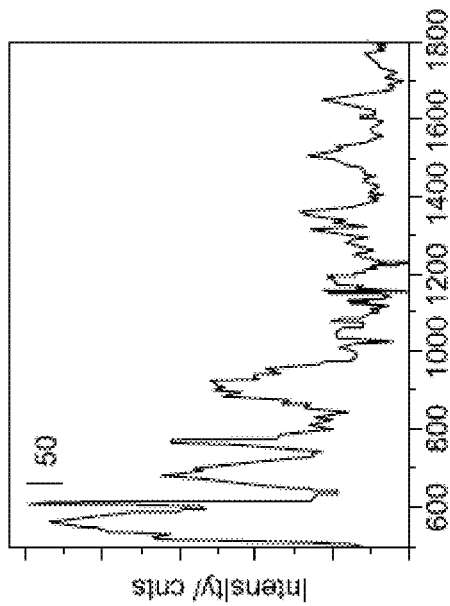
FIG. 7E shows a zoom in view of the selected area of the spectrum as marked by dashed rectangle in FIG. 7D.
Figure 7F:
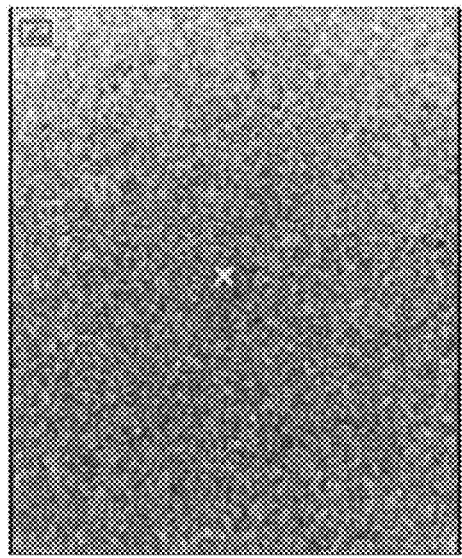
FIG. 7F shows a CCD image of the specimen along with the focused spot marked by white "x" used to obtain the SERS spectra.
Figure 7D:
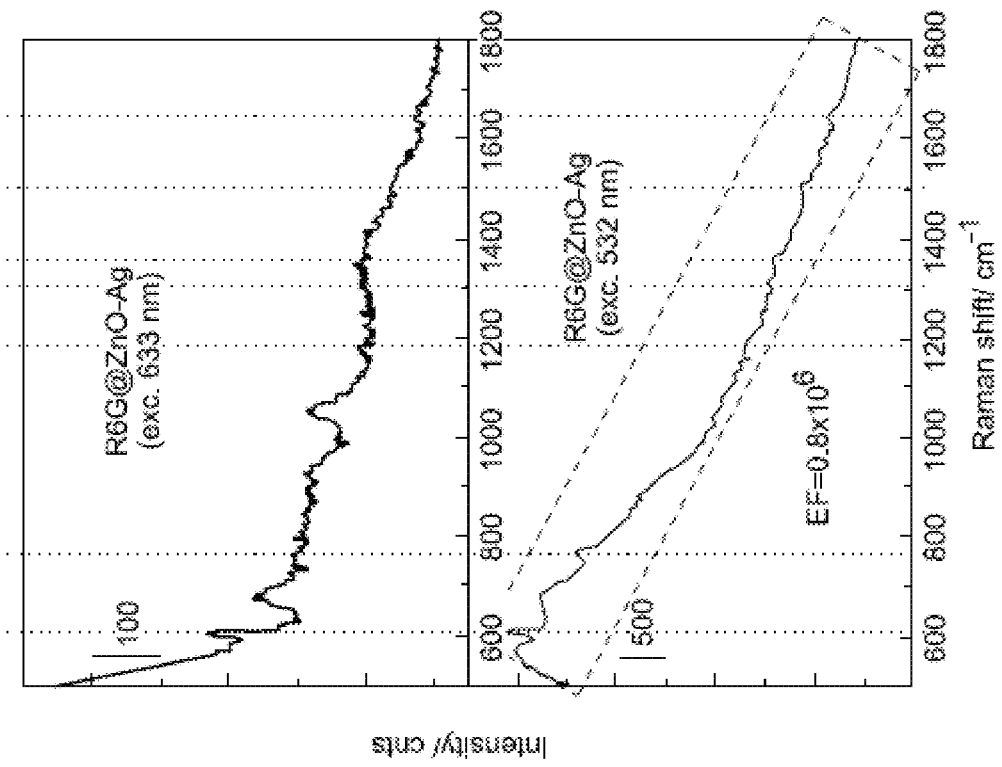
FIG. 7D illustrates SERS spectra of a Rhodamine 6G dye absorbed over ZnO—Ag layer and excited at 633 nm and 532 nm wavelength, according to exemplary embodiments.

Ag NPs coated with ZnO nanoclusters of 23.62±5.18 nm diameter changes the geometry in nanoscale and therefore it was expected to influence the SERS enhancement as per EM mechanism. Indeed, the SERS enhancement was found several times lower as shown in FIG. 7D. FIG. 7D shows SERS spectra of R6G adsorbed on ZnO—Ag specimen excited by 633 nm (upper panel) and 532 nm (lower panel). A zoom in view of selected area of the spectrum as marked by dashed rectangle and obtained at 532 nm excitation is shown in FIG. 7E. A CCD image of the same specimen along with the focusing spot marked by white "x" is shown in FIG. 7F. No damage or dissociation of R6G dyes was observed due to very low intensity and exposure of laser excitation. As mentioned above, the laser was turned off immediately after the measurement and the optical path was readjusted for another laser excitation without changing the focusing spot on the same specimen. Red vertical dashed lines are inserted to facilitate the readers to follow SERS peaks obtained in both cases. SERS bands observed under this investigation are tabulated in Table 1 along with corresponding band assignments. All the bands were observed in both cases with an exception that the band intensity was lower in case of 633 nm excitations with reference to those observed at 532 nm. It is noteworthy that SERS spectrum obtained at 532 nm excitation was having strong fluorescence background compare to that obtained at 633 nm. In such case, the EF deteriorated a lot and was estimated to be $0.8 \times 10^6$.

Figure 7H:
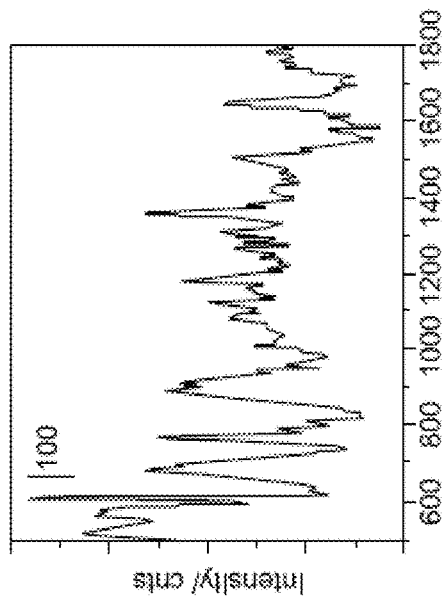
FIG. 7H shows a zoom in view of the selected area of the spectrum as marked by dashed rectangle in FIG. 7G.
Figure 7I:
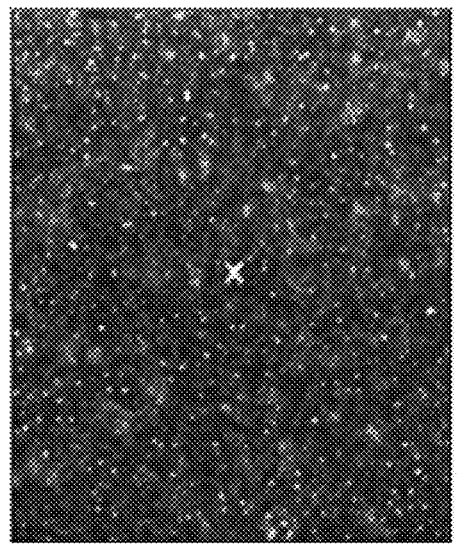
FIG. 7I shows a CCD image of the specimen along with the focused spot marked by white "x" used to obtain the SERS spectra.
Figure 7G:
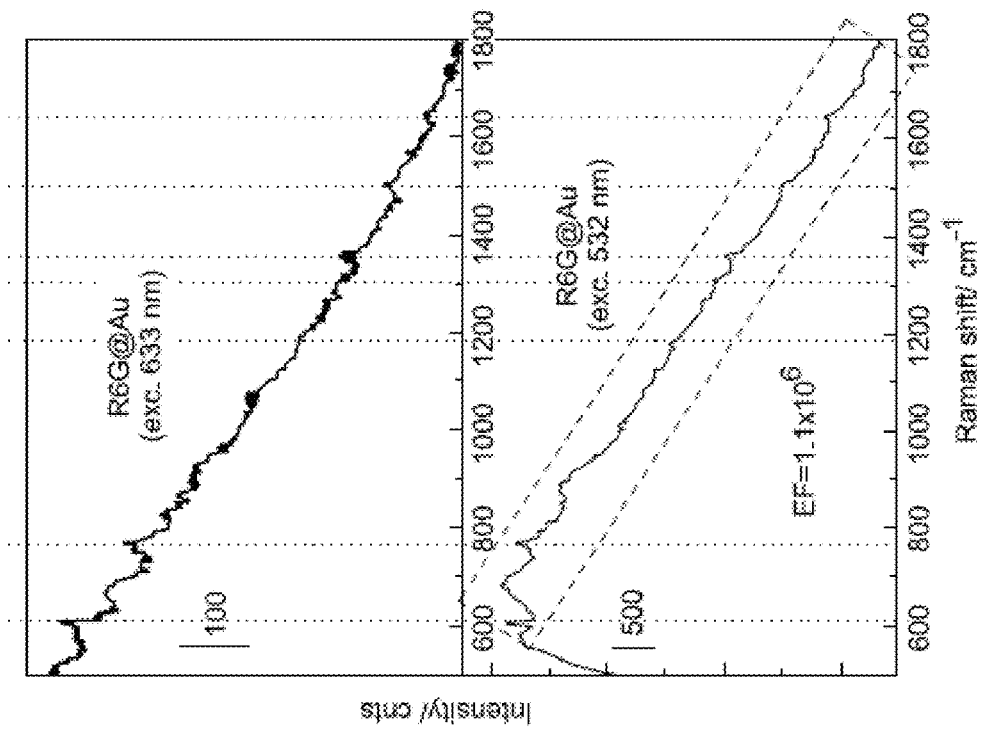
FIG. 7G illustrates SERS spectra of a Rhodamine 6G dye absorbed over Au NP and excited at 633 nm and 532 nm wavelength, according to exemplary embodiments.

For comparison, Au NPs was investigated to understand the SERS-activity within the same conditions. FIG. 7G represents SERS spectra of R6G adsorbed on Au NPs excited by 633 nm (upper panel) and 532 nm (lower panel). A zoom in view of selected area of the spectrum as marked by dashed rectangle and obtained at 532 nm excitation is shown in FIG. 7H. A CCD image of the same specimen along with the focused spot marked by white "x" used to obtain the SERS spectra is shown in FIG. 7I. As usual, due to very low intensity and exposure of laser excitation no damage or dissociation of R6G dyes observed. As mentioned above, the laser was turned off immediately after the measurement and the optical path was readjusted for another laser excitation without changing the focusing spot on the same specimen. Red vertical dashed lines are inserted to facilitate the readers to follow SERS peaks obtained in both cases. SERS bands observed under this investigation are tabulated in Table 1 along with corresponding band assignments. All the bands were observed in both cases with an exception that the band intensity was lower in case of 633 nm excitations with reference to those observed at 532 nm. It is noteworthy that SERS spectrum obtained at 532 nm excitation was having strong fluorescence background compare to that obtained at 633 nm. In such case, the EF was found as low as $1.1 \times 10^6$ and almost equivalent to that obtained in ZnO—Ag specimen and several times lower than that obtained in PGNSs.

Enhancement factor (EF) was calculated using the following empirical formula at the same experimental conditions, $$EF = \left(\frac{I_{SERS}}{I_{bulk}}\right) \times \left(\frac{C_{bulk}}{C_{SERS}}\right) \qquad (1)$$

Where $I_{SERS}$ and $I_{bulk}$, represent intensities of SERS and Raman measurements at a specific vibrational mode respectively, and $C_{SERS}$ and $C_{bulk}$ represent the molarities of molecules used in SERS and Raman measurements respectively. SERS band at 610 $cm^{-1}$ (C—C ring in-plane bending in phenyl rings) was considered to calculate the EF as described below.

TABLE 1

SERS bands of R6G observed under this investigation and corresponding band assignments

| SERS Bands of R6G (cm$^{-1}$) | Band assignments |
|---|---|
| 610 | C-C ring in-plane bending in phenyl rings |
| 767 | C-H out-of-plane bending |
| 1182 | C-H in-plane bending in xanthene ring |
| 1307 | hybrid mode (phenyl rings and NHC$_2$H$_5$) |
| 1357 | C-C stretching in xanthene ring |
| 1505 | C-C stretching in xanthene ring |
| 1645 | C-C stretching in xanthene ring |

Figure 8B:
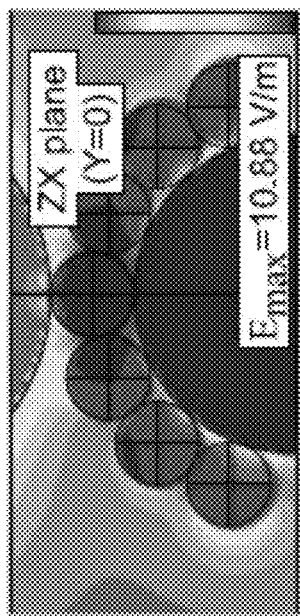
FIG. 8B shows an enhanced view of a selected area from FIG. 8A.
Figure 8C:
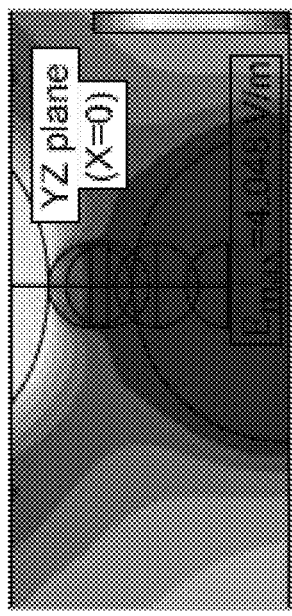
FIG. 8C illustrates EM near-field distributions near SERS substrate at YZ (X=0) plane excited at s-polarization, according to exemplary embodiments.
Figure 8D:
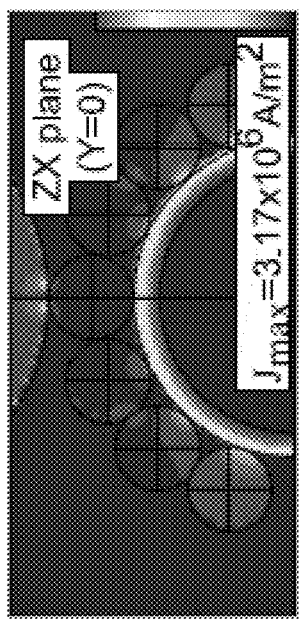
FIG. 8D illustrates the current density at ZX (Y=0) plane for the selected area shown in FIG. 8B.
Figure 8A:
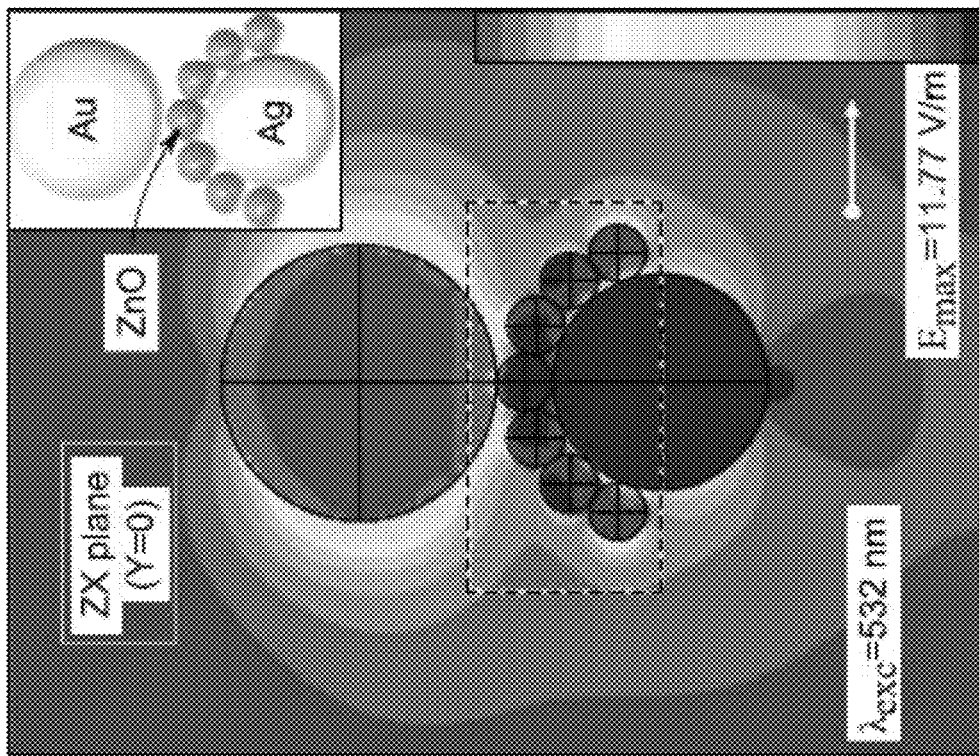
FIG. 8A illustrates EM near-field distributions near SERS substrate at ZX (Y=0) plane excited at s-polarization, according to exemplary embodiments.

As mentioned above, SERS enhancement relies heavily on EM near-field distributions and therefore FDTD analysis was carried out to understand EM near-field distributions for a typical geometry as shown in FIGS. 8A-8L. A typical model resembling PGNSs as shown in inset of FIG. 9a was used in this regards. The model was designed in such a way so that it resembles to the PGNSs to some extent, although it was quite hard to follow the exact morphology of PGNSs. The dimension and feature of the selected model was chosen as mentioned therein to facilitate an insight how EM near-field distributions get induced because of excitation at different polarization. FIG. 8A represents EM near-field distributions at ZX (Y=0) plane excited at s-polarization. Maximum EM near-field intensity of 11.77 V/m was found to be at ZX (Y=0) plane with wider distribution along the plane. Most of the EM near-field distribution was confined to Au NP, although weak EM near-field distributions were observed at the junctions of ZnO and Ag NPs. It is evident that in such configuration, analytes get sufficient opportunity to be within the strong EM near-field distributions and therefore enhanced SERS signals are expected. To understand further in details, a zoom in view of the simulated area as marked by white dotted rectangle in FIG. 9a, was analyzed in different planes as well. FIGS. 8B and 8C represent EM near-field distributions of the marked area at ZX (Y=0)- and YZ (X=0)-planes respectively. At ZX (Y=0) plane, maximum EM near-field intensity (10.88 V/m) was found to be located at the junctions of ZnO and Au NPs whereas those at the junctions of ZnO and Ag were negligible (FIG. 8B). In case of YZ (X=0) plane, it was further confirmed that the junctions between ZnO and Au provided strongest EM near-field distributions, although the maximum EM near-field intensity (4.048 V/m) was found to be less than half of that observed in ZX (Y=0) plane (FIG. 8C). In Maxwell's equations, current density has been defined as the amount of charge per unit time that flows through a unit area. Therefore, the current density is a vector whose magnitude is the current per solid angle (A/m$^2$) at a given point in space along the motion of the positive charges. FIG. 8D represents such current density at ZX (Y=0) plane for the selected area of interest as marked by white dotted rectangle in FIG. 8A. It is noteworthy that the current density ($J_{max}$=3.17×10$^6$ A/m$^2$) was observed mostly confined at the interface of ZnO and Ag NPs with a negligible distribution at the interface of ZnO and Au NPs.

Figure 8F:
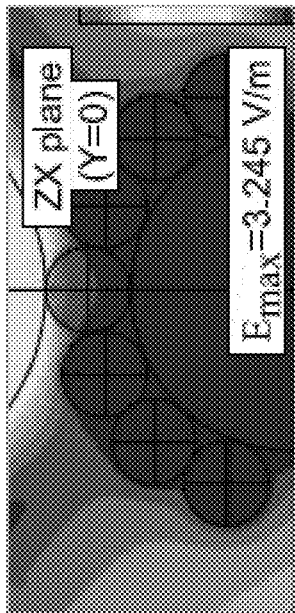
FIG. 8F shows an enhanced view of a selected area from FIG. 8E.
Figure 8G:
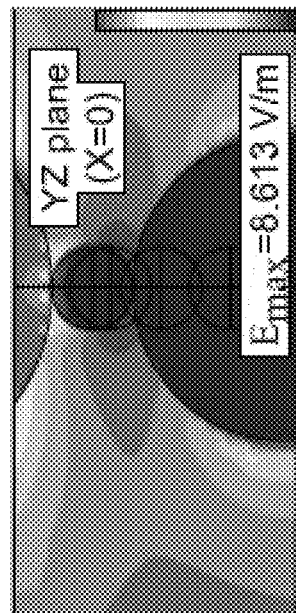
FIG. 8G illustrates EM near-field distributions near SERS substrate at YZ (X=0) plane excited at p-polarization, according to exemplary embodiments.
Figure 8H:
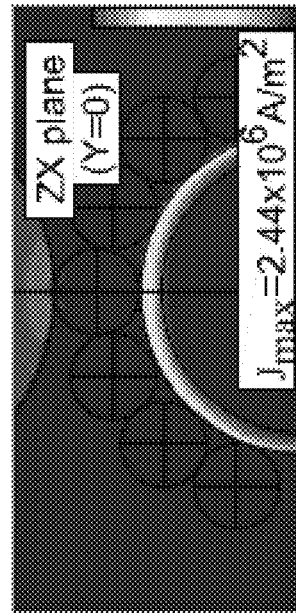
FIG. 8H illustrates the current density at ZX (Y=0) plane for the selected area shown in FIG. 8F.
Figure 8E:
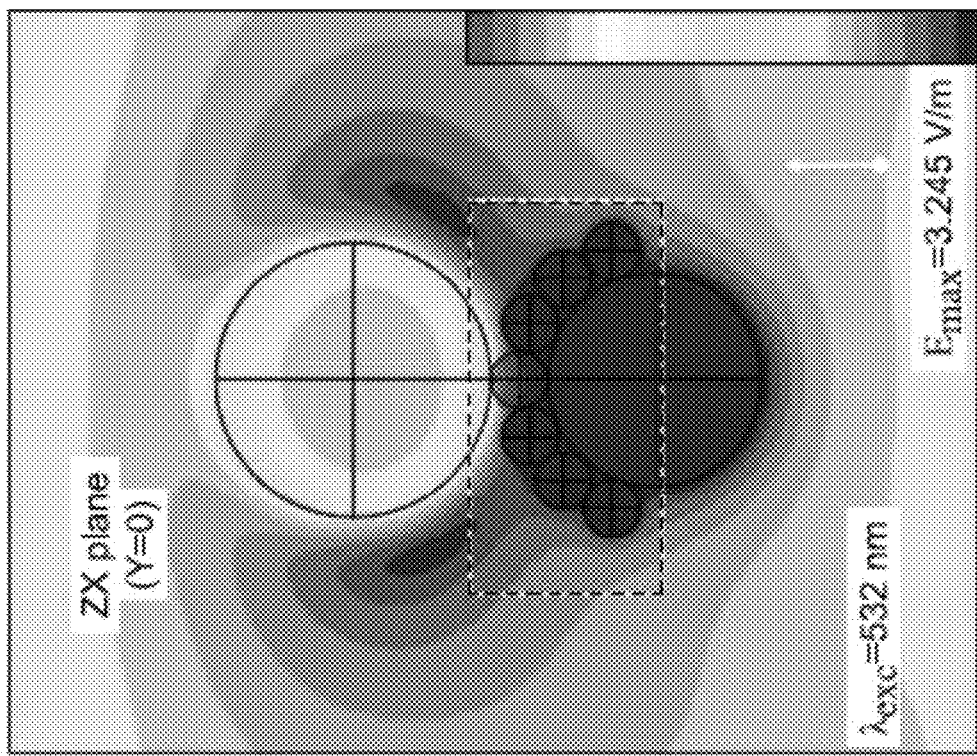
FIG. 8E illustrates EM near-field distributions near SERS substrate at ZX (Y=0) plane excited at p-polarization, according to exemplary embodiments.

The same model was further investigated for excitation of p-polarization. It is well-known that the EM near-field distribution follows the excitation polarization [Hossain, M. K., Spectrochimica Acta Part A: Molecular and Biomolecular Spectroscopy, 2020, 242, 118759; and Hossain, M. K., et. al., Physical Chemistry Chemical Physics, 2015, 17, 6, 4268-4276, each of which is incorporated herein by reference in its entirety]. FIG. 8E shows EM near-field distributions of the same model obtained at ZX (Y=0) plane and simulated at p-polarization. As shown in FIG. 8E, maximum EM near-field intensity 3.245 V/m, was found lower than those obtained at s-polarization. Most of the EM near-field distribution was confined to Au NP, although the strongest site was observed to be at the interstitial of Au and ZnO NPs. A zoom in views of the EM near-field distribution of interest as marked by white dotted rectangle in FIG. 9b were further elaborated as insets. FIGS. 8F and 8G represent EM near-field distributions of the marked area at ZX (Y=0)- and YZ (X=0)-planes respectively. At ZX (Y=0) plane, maximum EM near-field intensity (3.245 V/m) was found to be located at the junctions of ZnO and Au NPs whereas those at the interface of ZnO and Ag were negligible as shown in FIG. 8F. In case of YZ (X=0) plane, it was further confirmed that the junctions between ZnO and Au NPs provided strongest EM near-field distributions, although the maximum EM near-field intensity (8.613 V/m) was found almost double with reference to that observed in ZX (Y=0) plane as shown in FIG. 8G. As shown in FIG. 8H, the current density ($J_{max}$=2.44×10$^6$ A/m$^2$) was observed lower with reference to that observed in s-polarization and mostly confined at the interface of ZnO and Ag NPs. In case of oblique angle, 45° of incident polarization, the EM near-field distributions were found to be more uniform in all the planes compared to those observed in s- and p-polarizations.

Figure 8J:
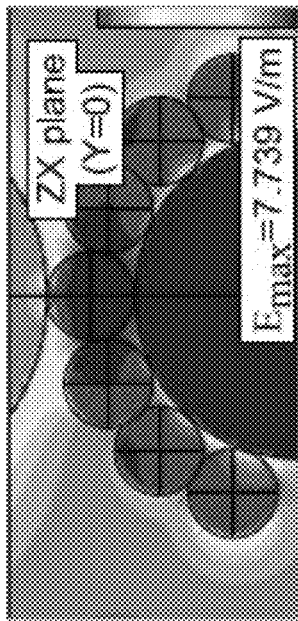
FIG. 8J shows an enhanced view of a selected area from FIG. 8I.
Figure 8K:
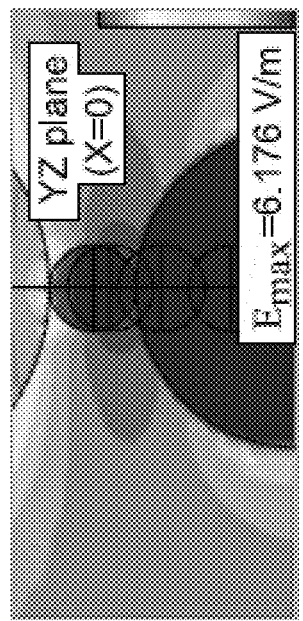
FIG. 8K illustrates EM near-field distributions near SERS substrate at YZ (X=0) plane excited at 45° of incident polarization, according to exemplary embodiments.
Figure 8L:
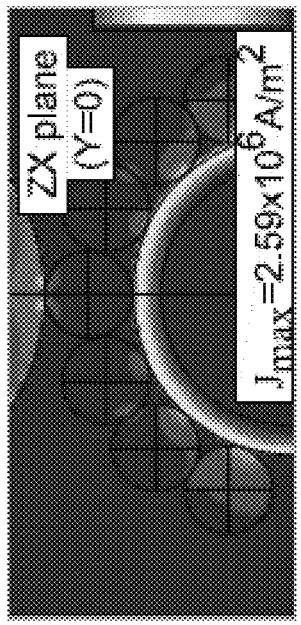
FIG. 8L illustrates the current density at ZX (Y=0) plane for the selected area shown in FIG. 8J.
Figure 8I:
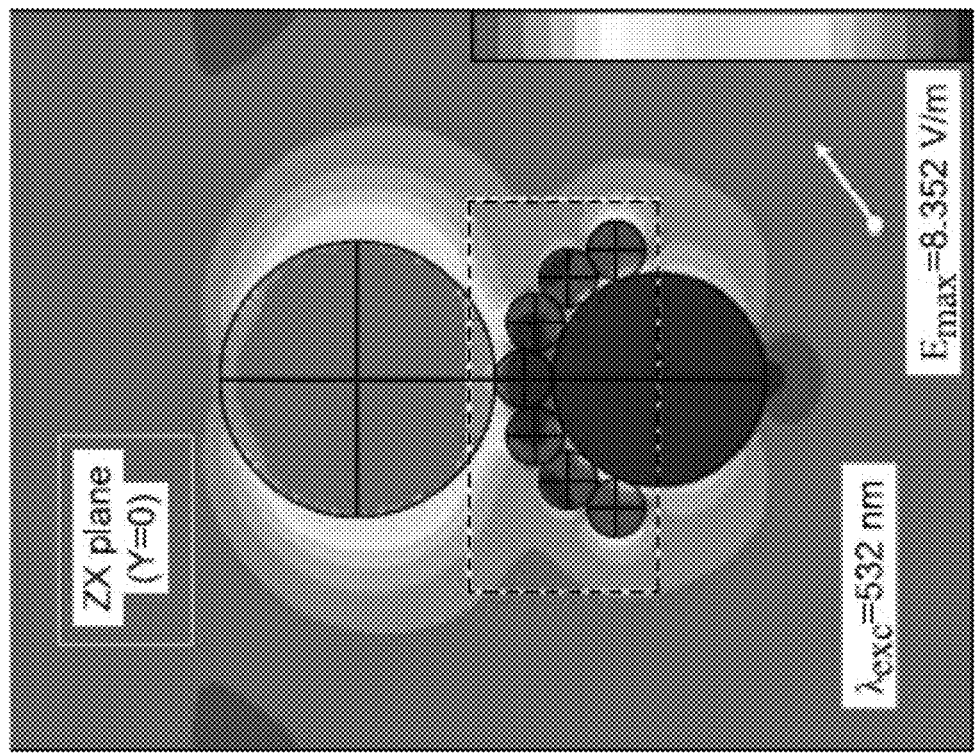
FIG. 8I illustrates EM near-field distributions near SERS substrate at ZX (Y=0) plane excited at 45° of incident polarization, according to exemplary embodiments.

FIG. 8I shows EM near-field distributions of the same model geometry at ZX (Y=0) plane simulated at 45° of incident polarization. Maximum EM near-field intensity (8.352 V/m) was found a bit lower than that obtained at s-polarization but almost triple to that obtained at p-polarization. Similar to those observed at s- and p-polarization, most of the EM near-field distribution was confined to Au NP, although weak EM near-field distributions were observed at the junctions of ZnO and Ag NPs. EM near-field distributions for planes ZX (Y=0) and YZ (X=0) were observed to be nearly same as shown in FIGS. 8J and 8K. At ZX (Y=0) plane, maximum EM near-field intensity (7.739 V/m) was found to be located at the junctions of ZnO and Au NPs whereas those at the junctions of ZnO and Ag were negligible as shown in FIG. 8J. In case of YZ (X=0) plane, it was further confirmed that the junctions between ZnO and Au provided strongest EM near-field distributions (6.176 V/m) (FIG. 8K). For 45° of incident polarization, the current density ($J_{max}$=2.59×10$^6$ A/m$^2$) was observed mostly confined at the interface of ZnO and Ag NPs with a negligible distribution at the junction of ZnO and Au NPs as shown in FIG. 8L.

Three scenarios have been demonstrated in simulations whereas the same model was investigated at s-, p- and 45° of incident polarizations. In case of s- and 45° of incident polarizations, most of the EM near-field distributions were found enhanced around the Au NPs. In case of p-polarization, EM near-field distributions were found to be lower with reference to those obtained at s- and 45° of incident polarizations and most confined at the surface of Au nanoparticles. However, in such scenario, the target analytes got more opportunity to be within enhanced EM near-field distribution and thus enhanced SERS signals were expected. Indeed, as shown in FIG. 7A, SERS enhancement of R6G adsorbed on PGNSs was found higher compared to those estimated for ZnO—Ag and Au specimens. Such artificial PGNS geometry and its allotropes were found promising candidates as SERS-active substrates as well as a new nanometric SERS-active structures to exploit underlying EM near-field distributions.

The invention claimed is:

1. A method of obtaining a Raman spectrum of an analyte, the method comprising:
depositing the analyte onto a surface-enhanced Raman scattering (SERS) substrate to form a sample;
exposing the sample to laser light such that a portion of the laser light is scattered by the sample to form scattered light; and
detecting the scattered light,
wherein the surface-enhanced Raman scattering (SERS) substrate, comprises:
a solid support;
first noble metal nanoparticles disposed on the solid support;
a continuous porous oxide layer consisting of ZnO nanoparticles disposed on the first noble metal nanoparticles; and
second noble metal nanoparticles disposed on the continuous porous oxide layer,
wherein the continuous porous oxide layer prevents contact between the first noble nanoparticles and the second noble nanoparticles and has a mean pore size of 2 to 30 nm.

2. The method of claim 1, wherein the analyte contacts at least one selected from the group consisting of the first noble metal nanoparticles, the continuous porous oxide layer, and the second noble metal nanoparticles.

3. The method of claim 2, wherein the laser light has a wavelength of 522 to 542 nm and the SERS substrate has an enhancement factor of greater than $1.1 \times 10^6$ to $5.9 \times 10^6$.

4. The method of claim 1, wherein the solid support is glass.

5. The method of claim 1, wherein the first noble metal and second noble metal are each independently selected from the group consisting of gold, platinum, palladium, ruthenium, rhodium, osmium, silver, copper, mercury, rhenium, iridium, and alloys thereof.

6. The method of claim 1, wherein the first noble metal nanoparticles are silver nanoparticles.

7. The method of claim 6, wherein the silver nanoparticles are crystalline by PXRD and have a mean particle size of 40 to 130 nm.

8. The method of claim 1, wherein the second noble metal nanoparticles are gold nanoparticles.

9. The method of claim 8, wherein the gold nanoparticles are crystalline by PXRD and have a mean particle size of 75 to 150 nm.

10. The method of claim 1, wherein the transition metal oxide nanoparticles are wurtzite zinc oxide nanoparticles which are crystalline by PXRD and have a mean particle size of 10 to 50 nm.

11. The method of claim 1, wherein the zinc oxide nanoparticles are present in the porous oxide layer as agglomerates having a mean size of 150 to 300 nm.

12. The method of claim 1, having a band gap of greater than 3.16 eV to 3.30 eV.

* * * * *